(12) United States Patent
Parker et al.

(10) Patent No.: US 8,089,737 B2
(45) Date of Patent: Jan. 3, 2012

(54) ARC FAULT CIRCUIT INTERRUPTER AND METHOD PROVIDING IMPROVED NUISANCE TRIP REJECTION

(75) Inventors: Kevin L. Parker, Pittsburgh, PA (US); Theodore J. Miller, Oakdale, PA (US)

(73) Assignee: Eaton Corporation, Cleveland, OH (US)

( * ) Notice: Subject to any disclaimer, the term of this patent is extended or adjusted under 35 U.S.C. 154(b) by 476 days.

(21) Appl. No.: 12/339,516

(22) Filed: Dec. 19, 2008

(65) Prior Publication Data

US 2010/0157486 A1    Jun. 24, 2010

(51) Int. Cl.
*H02H 3/00* (2006.01)
(52) U.S. Cl. .......................................................... 361/42
(58) Field of Classification Search ...................... 361/42
See application file for complete search history.

(56) References Cited

U.S. PATENT DOCUMENTS

| | | |
|---|---|---|
| 5,224,006 A | 6/1993 | MacKenzie et al. |
| 5,432,455 A | 7/1995 | Blades |
| 5,434,509 A | 7/1995 | Blades |
| 5,691,869 A | 11/1997 | Engel et al. |
| 5,729,145 A | 3/1998 | Blades |
| 6,522,228 B2 | 2/2003 | Wellner et al. |
| 6,522,509 B1 | 2/2003 | Engel et al. |
| 6,542,056 B2 | 4/2003 | Nerstrom et al. |
| 6,577,138 B2 * | 6/2003 | Zuercher et al. .............. 324/536 |
| 6,710,688 B2 | 3/2004 | Wellner et al. |
| 2005/0203672 A1 | 9/2005 | Restrepo et al. |
| 2005/0286185 A1 | 12/2005 | Henson et al. |
| 2007/0208981 A1 | 9/2007 | Restrepo et al. |
| 2008/0091308 A1 | 4/2008 | Henson et al. |
| 2008/0106832 A1 | 5/2008 | Restrepo et al. |
| 2009/0040665 A1 * | 2/2009 | Elms et al. ...................... 361/42 |

OTHER PUBLICATIONS

Restrepo, C., "Arc Fault Detection and Discrimination Methods", 4.4 IEEE, 2007, pp. 115-122.

* cited by examiner

*Primary Examiner* — Jared Fureman
*Assistant Examiner* — Scott Bauer
(74) *Attorney, Agent, or Firm* — Martin J. Moran

(57) ABSTRACT

An arc fault circuit interrupter includes separable contacts, an operating mechanism and an arc fault detector structured to detect an arc fault condition operatively associated with the contacts. The arc fault detector includes a tuned current sensor structured to sense broadband noise of a current flowing through the contacts, a compression circuit including an input of the sensed broadband noise and an output. The compression circuit compresses the dynamic range of the sensed broadband noise. A minimum detector includes an input of the compression circuit output and an output of the minimum value of the minimum detector input. A processor includes a number of inputs and an output. One of the inputs is the output of the minimum value of the minimum detector. A trip mechanism cooperates with the output of the processor and the operating mechanism to trip open the contacts responsive to the detected arc fault condition.

24 Claims, 15 Drawing Sheets

ARC FAULT CIRCUIT INTERRUPTER AND METHOD PROVIDING IMPROVED NUISANCE TRIP REJECTION

BACKGROUND

1. Field

The disclosed concept pertains generally to circuit interrupters and, more particularly, to arc fault circuit interrupters. The disclosed concept also pertains to methods of detecting arc faults.

2. Background Information

Circuit breakers are used to protect electrical circuitry from damage due to an overcurrent condition, such as an overload condition or a relatively high level short circuit or fault condition. In small circuit breakers, commonly referred to as miniature circuit breakers, used for residential and light commercial applications, such protection is typically provided by a thermal-magnetic trip device. This trip device includes a bimetal, which heats and bends in response to a persistent overcurrent condition. The bimetal, in turn, unlatches a spring powered operating mechanism, which opens the separable contacts of the circuit breaker to interrupt current flow in the protected power system.

An arc fault circuit interrupter (AFCI) is a device intended to mitigate the effects of arc faults by functioning to deenergize an electrical circuit when an arc fault is detected. Non-limiting examples of AFCIs include: (1) arc fault circuit breakers; (2) branch/feeder arc fault circuit interrupters, which are intended to be installed at the origin of a branch circuit or feeder, such as a panelboard, and which may provide protection from series arc faults, ground faults and line-to-neutral faults up to the outlet; (3) outlet circuit arc fault circuit interrupters, which are intended to be installed at a branch circuit outlet, such as an outlet box, in order to provide protection of cord sets and power-supply cords connected to it (when provided with receptacle outlets) against the unwanted effects of arcing, and which may provide protection from series arc faults, line-to-ground faults and line-to-neutral faults; (4) cord arc fault circuit interrupters, which are intended to be connected to a receptacle outlet, in order to provide protection to an integral or separate power supply cord; (5) combination arc fault circuit interrupters, which function as either a branch/feeder or an outlet circuit AFCI; and (6) portable arc fault circuit interrupters, which are intended to be connected to a receptacle outlet and provided with one or more outlets.

During sporadic arc fault conditions, the overload capability of a conventional circuit breaker will not function since the root-mean-squared (RMS) value of the fault current is too small to activate the automatic magnetic trip circuit. The addition of electronic arc fault sensing to a circuit breaker can add one of the elements needed for sputtering arc fault protection-ideally, the output of an electronic arc fault sensing circuit directly trips and, thus, opens the circuit breaker. See, for example, U.S. Pat. Nos. 6,710,688; 6,542,056; 6,522,509; 6,522,228; 5,691,869; and 5,224,006.

Arc faults can be series or parallel. Examples of a series arc are a broken wire where the ends of the broken wire are close enough to cause arcing, or a relatively poor electrical connection. Parallel arcs occur between conductors of different potential including, for example, a power conductor and a ground. Unlike a parallel arc fault, series arc faults do not usually create an increase in current since the fault is in series with the load. In fact, a series arc fault may result in a slight reduction in load current and not be detected by the normal overload and overcurrent protection of conventional protection devices. Even the parallel arc, which can draw current in excess of normal rated current in a circuit, produces currents which can be sporadic enough to yield RMS values less than that needed to produce a thermal trip, or at least delay operation. Effects of the arc voltage and line impedance often prevent the parallel arc from reaching current levels sufficient to actuate the instantaneous trip function.

Both safe and unsafe series arcs occur in power circuits, such as electrical power distribution systems (or electrical distribution systems). One example of safe series arcs occurs in the commutator brushes of direct current (DC) and universal motors. In order to minimize brush heating and erosion, universal motors are designed to minimize the net duration and thereby the total energy dissipated by commutation arcing. The materials and physical shape of the commutator brushes are chosen, in order that they are minimally affected by the arcing. Hence, the series arcs that occur in universal motors are intended and perform a constructive purpose.

In contrast, a combination of random processes is known to produce an unintended series arc in electrical distribution systems. The unintended series arcs may become hazardous when the net duration and total energy dissipation of the arc are uncontrolled, and localized heating produced by the arc may damage or even ignite things nearby. Thus, unsafe series arcs in electrical distribution systems could theoretically result in loss of property or even life.

Arcs that safely occur within universal motors and unsafe series arcs that happen by random chance are the exact same physical phenomena; however, one occurs by design and creates a benefit while the other is unintended and may be destructive. Thus, there is a need for circuit interrupters that accurately distinguish between safe series arcing (e.g., without limitation, in universal motors) and unintended, potentially hazardous series arcs, and trip in response to only the latter. This need is further compounded by the reality that, of all series arcs in power distribution systems, only a fraction are the unintended, unsafe variety.

There is room for improvement in arc fault circuit interrupters.

There is also room for improvement in methods of detecting arc faults.

SUMMARY

These needs and others are met by embodiments of the disclosed concept, which improve the ability of an arc fault circuit interrupter to distinguish hazardous series arc faults without nuisance tripping. The disclosed arc fault circuit interrupter is intended to trip only in response to truly unsafe arcs.

As one aspect of the disclosed concept, an arc fault circuit interrupter comprises: separable contacts; an operating mechanism structured to open and close the separable contacts; an arc fault detector structured to detect an arc fault condition operatively associated with the separable contacts, the arc fault detector comprising: a tuned current sensor structured to sense broadband noise of a current flowing through the separable contacts, a compression circuit including an input of the sensed broadband noise from the tuned current sensor and an output, the compression circuit being structured to compress the dynamic range of the sensed broadband noise, a minimum detector including an input of the output of the compression circuit and an output of the minimum value of the input of the minimum detector, and a processor including a number of inputs and an output, one of the number of inputs being the output of the minimum value of the minimum detector; and a trip mechanism cooperating with the output of the processor and the operating mechanism to trip open the separable contacts responsive to the detected arc fault condition.

The processor may be structured to input the output of the minimum detector synchronous with an alternating current half-cycle, compare a profile of the output of the minimum detector versus phase angle of the alternating current half-cycle against a plurality of profiles operatively associated with series arcs, and determine whether each alternating current half-cycle corresponds to one of the plurality of profiles.

The arc fault detector may comprise a zero crossing detector structured to synchronize the processor with a plurality of line half-cycles. The processor may comprise an analog-to-digital converter structured to input and convert the output of the minimum detector, and a routine structured to input and reset the output of the minimum detector a plurality of times for each of the line half-cycles.

The output of the minimum detector may be proportional to the minimum of the logarithm of the envelope of the sensed broadband noise; the output of the minimum detector may be structured to increase in response to continuous broadband noise from the arc fault condition; and the output of the minimum detector may be structured to not increase in response to non-continuous broadband noise.

As another aspect of the disclosed concept, a method of detecting an arc fault condition of an alternating current power circuit having a plurality of half-cycles comprises: sensing broadband noise of a current flowing in the power circuit; compressing the dynamic range of the sensed broadband noise; detecting a minimum of the compressed and sensed broadband noise for a plurality of samples for each of the half-cycles; determining a minimum value from the minimum of the compressed and sensed broadband noise for the samples for each of the half-cycles; determining a maximum value from the minimum of the compressed and sensed broadband noise for the samples for each of the half-cycles; determining a dynamic range value from the difference between the maximum value and the minimum value; determining a count of a number of the samples that exceed a first predetermined value for each of the line half-cycles; determining a condition defined by: (a) the dynamic range value being greater than a second predetermined value, (b) the minimum value occurs at one of either a plurality of the samples at the beginning of a corresponding one of the line half-cycles or a plurality of the samples at the end of the corresponding one of the line half-cycles, and (c) the count of the number of the samples that exceed the first predetermined value being greater than a third predetermined value; increasing an accumulator responsive to the condition being met or decreasing the accumulator responsive to the condition not being met; and detecting the arc fault condition when the accumulator exceeds a fourth predetermined value.

As another aspect of the disclosed concept, a method of detecting an arc fault condition of an alternating current power circuit having a plurality of half-cycles comprises: sensing broadband noise of a current flowing in the power circuit; compressing the dynamic range of the sensed broadband noise; detecting a minimum of the compressed and sensed broadband noise for a plurality of samples for each of the half-cycles; determining a minimum value from the minimum of the compressed and sensed broadband noise for the samples for each of the half-cycles; determining a maximum value from the minimum of the compressed and sensed broadband noise for the samples for each of the half-cycles; determining a dynamic range value from the difference between the maximum value and the minimum value; determining a maximum difference between subsequent values from the minimum of the compressed and sensed broadband noise for each of the line half-cycles; determining a count of a number of the minimum of the compressed and sensed broadband noise that are less than a first predetermined value for each of the line half-cycles plus a number of the minimum of the compressed and sensed broadband noise that are greater than a second predetermined value for each of the line half-cycles; determining a condition defined by: (a) the dynamic range value being greater than a third predetermined value, (b) the last such count being greater than a fourth predetermined value, (c) the maximum difference being greater than a fifth predetermined value, (d) the maximum difference occurs after a first sample at the beginning of a corresponding one of the line half-cycles, and (e) the maximum difference occurs before a plurality of samples at the end of the corresponding one of the line half-cycles; increasing an accumulator responsive to the condition being met or decreasing the accumulator responsive to the condition not being met; and detecting the arc fault condition when the accumulator exceeds a sixth predetermined value.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the term "processor" means a programmable analog and/or digital device that can store, retrieve, and process data; a computer; a workstation; a personal computer; a microprocessor; a microcontroller; a microcomputer; a central processing unit; a mainframe computer; a mini-computer; a server; a networked processor; or any suitable processing device or apparatus.

As employed herein, the term "tuned current sensor" means a current sensor (e.g., without limitation, a current transformer) structured to sense broadband noise of a current at a predefined frequency or a predefined range of frequencies. Such predefined frequency or frequencies are substantially greater than a corresponding line frequency (e.g., without limitation, 60 Hz). The range of frequencies can, for example, be fixed or can be dynamically changed (e.g., without limitation, by a processor).

As employed herein, the term "dynamic range" means the ratio or difference between the smallest and largest possible values of a changeable quantity (e.g., without limitation, amplitude; magnitude).

As employed herein, the term "compression circuit" or "compression" means a circuit structured to compress the dynamic range of a signal. For example and without limitation, dynamic range compression or compression reduces the dynamic range of a signal. A non-limiting example of a compression circuit is a demodulating (e.g., a logarithmic function is applied to the envelope of the output signal of a sensor, where the envelope is produced by a demodulator or other suitable amplitude modulation receiver) logarithmic amplifier structured to rectify a signal and perform a logarithmic conversion on the amplitude of a filtered version of such rectified signal.

The disclosed concept is described in association with a single pole arc fault circuit interrupter (AFCI) 50, although the disclosed concept is applicable to AFCIs having any number of poles.

Series arcs generate broadband high frequency power line noise. Commutation arcs in motors consist of a series of discretely spaced, very short-lived arcs, which strike and quench repeatedly throughout each half-cycle. These arcs are manifested by a series of discretely spaced, very short-lived bursts of broadband noise on the power line. Similarly, loads with power electronics produce broadband noise as a result of current commutation in switching devices. These commutation events are also manifested by a series of discretely spaced, very short-lived bursts of broadband noise on the power line. Series arcs which consist of relatively many brief pulses whose net conduction time is relatively small compared to the half-cycle period of the source voltage dissipate much less energy than series arcs which are continuous and persist over a sizable fraction of each half-cycle.

Figure 1:
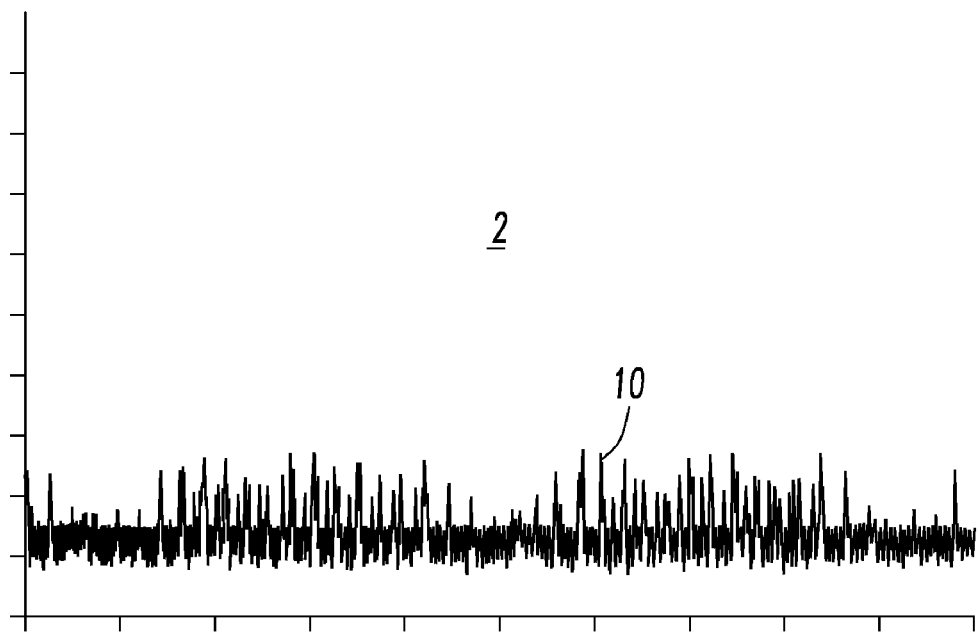
FIG. 1 is a plot of logarithm of demodulated broadband power line noise produced by universal motor commutation.
Figure 2:
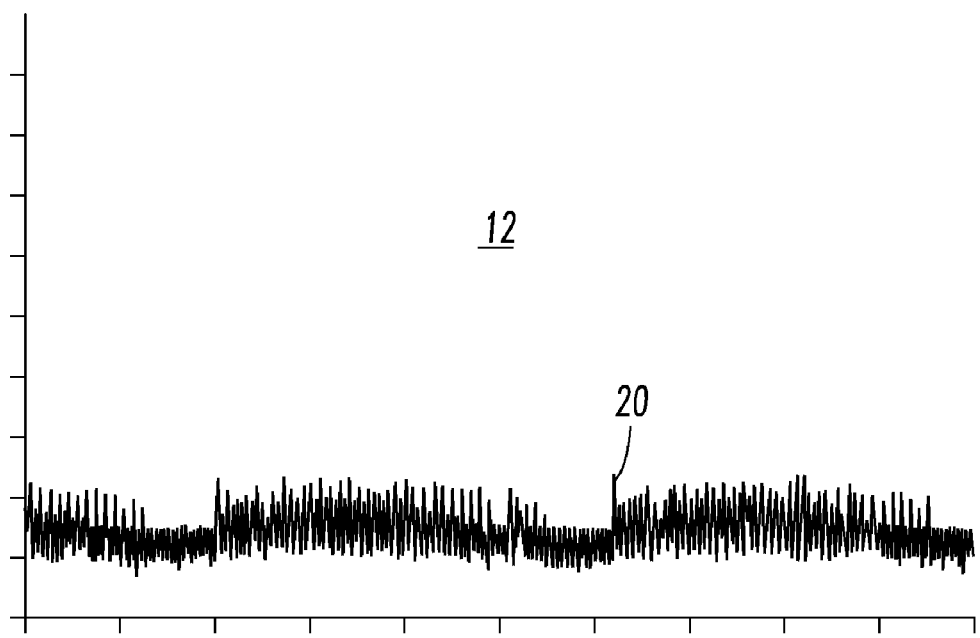
FIG. 2 is a plot of logarithm of demodulated broadband power line noise produced by power electronic switching.

Typical broadband noise signatures produced by universal motor commutation and power electronic switching are shown in FIGS. 1 and 2, respectively. The plot 2 of FIG. 1 is produced using a suitable handheld sander (not shown) and demonstrates the discrete nature of power line noise produced by motor commutation. The plot 2 includes the logarithm of demodulated broadband power line noise 10.

The plot 12 of FIG. 2 is produced using a vacuum sweeper (not shown) and demonstrates the discrete nature of power line noise produced by power electronic switching. The plot 12 includes the logarithm of demodulated broadband power line noise 20.

Rather than striking and quenching many times per half-cycle, hazardous series arcs (e.g., without limitation, those resulting from the test procedures of UL1699) are believed to strike and quench once per half-cycle, and to persist throughout a substantial portion of each half-cycle. Thus, hazardous series arcs are believed to be uniquely indicated by continuous, relatively long-lived bursts of broadband noise that persist for a substantial portion of each half-cycle.

Figure 3:
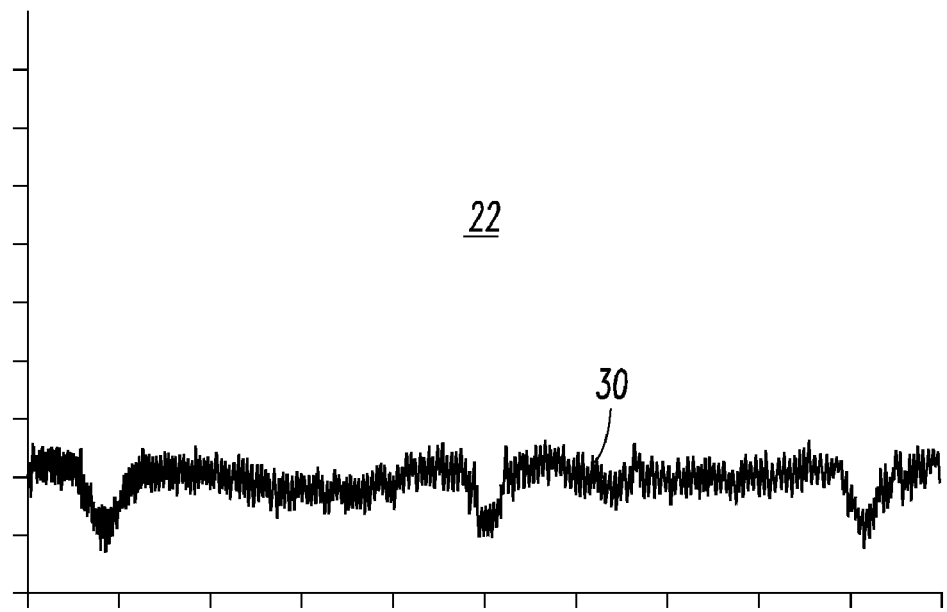
FIG. 3 is a plot of logarithm of demodulated broadband power line noise produced by an arc in series with a resistor.

A typical broadband noise signature produced by a series arc is shown by the plot 22 of FIG. 3. In particular, the broadband noise signature is produced by an arc in series with a 5 A resistor (not shown), generated using an opposing electrode arc generator (not shown) specified by UL1699. This demonstrates the continuous nature of power line noise produced by series arcing. The plot 22 includes the logarithm of demodulated broadband power line noise 30.

Figure 4:
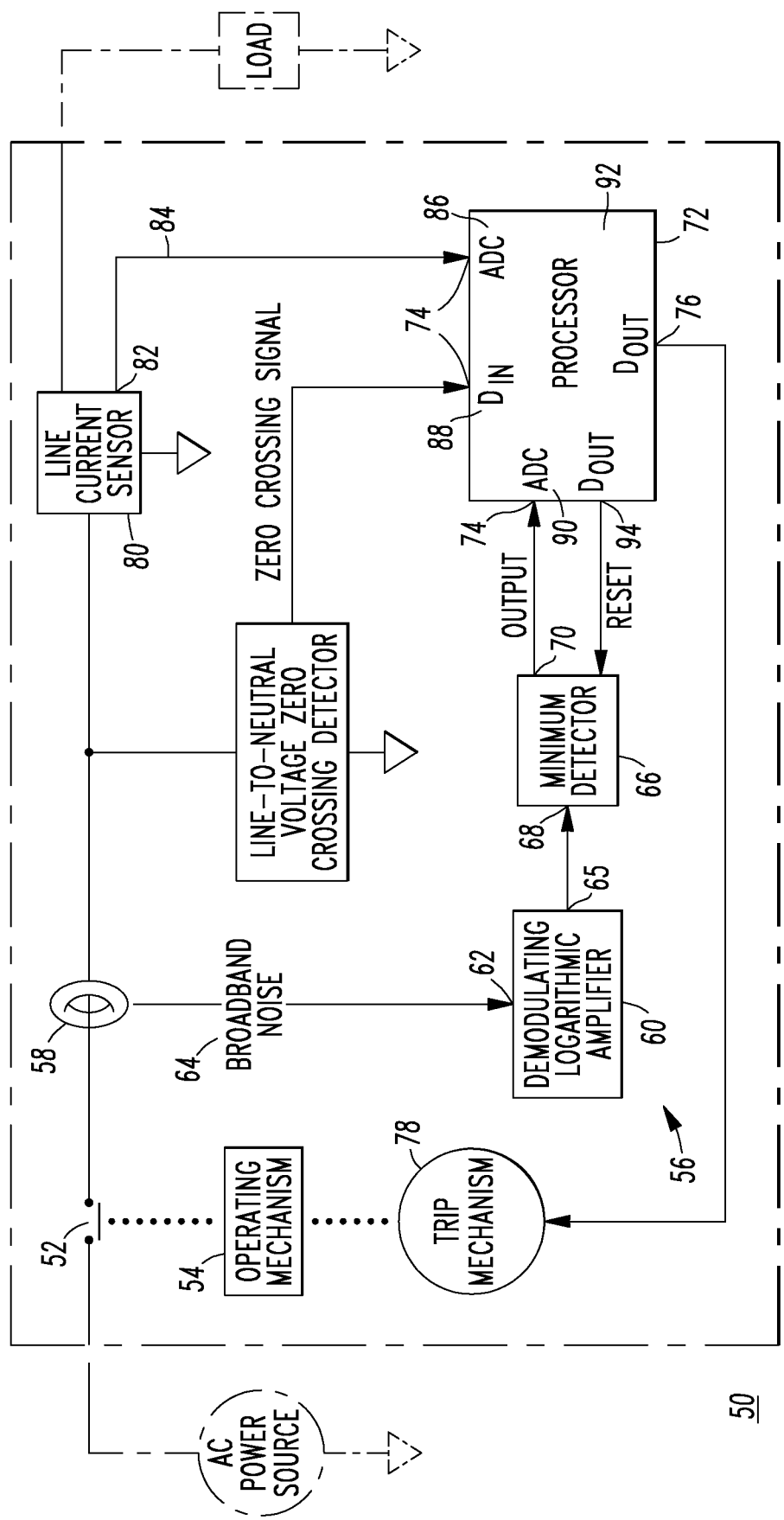
FIG. 4 is a block diagram in schematic form of an arc fault circuit interrupter in accordance with embodiments of the disclosed concept.

Referring to FIG. 4, the AFCI 50 includes separable contacts 52, an operating mechanism 54 structured to open and close the separable contacts 52 and an arc fault detector 56 structured to detect an arc fault condition operatively associated with the separable contacts 52. The arc fault detector 56 includes a tuned current sensor 58 structured to sense broadband noise of a current flowing through the separable contacts 52, a compression circuit, such as, for example and without limitation, a demodulating logarithmic amplifier 60, including an input 62 of sensed broadband noise 64 from the tuned current sensor 58 and an output 65. The compression circuit 60 is structured to compress the dynamic range of the sensed broadband noise 64. A minimum detector 66 includes an input 68 of the compression circuit output 65 and an output 70 of the minimum value of the minimum detector input 68. A processor 72 includes a number of inputs 74 and an output 76. One of the inputs 74 is the minimum value output 70 of the minimum detector 66. A trip mechanism 78 cooperates with the processor output 76 and the operating mechanism 54 to trip open the separable contacts 52 responsive to the detected arc fault condition.

EXAMPLE 1

The tuned current sensor 58 is structured to output the sensed broadband noise 64, which is proportional to electrical energy, which propagates along the power line.

EXAMPLE 2

The tuned current sensor 58 is a current transformer structured to resonate at about 15 MHz.

EXAMPLE 3

The demodulating logarithmic amplifier 60 is structured to rectify the sensed broadband noise 64 and perform a logarithmic conversion of the amplitude of the rectified sensed broadband noise. Alternatively, the logarithmic conversion function could be replaced by another suitable non-linear function that has a net effect of compressing the dynamic range of the rectified sensed broadband noise.

EXAMPLE 4

The processor 72 is structured to periodically input (e.g., without limitation, 32 times per alternating current half-cycle) the minimum detector output 70. As will be discussed, below, in connection with FIGS. 9A, 9B, 10A, 10B, 11A, 11B and 11C, the processor 72 is further structured to input the minimum detector output 70 synchronous with the alternating current half-cycle, compare a profile of the minimum detector output 70 versus phase angle of the alternating current half-cycle against a plurality of high frequency profiles operatively associated with hazardous series arcs, and determine whether each alternating current half-cycle corresponds to one of the plurality of profiles. If a sufficient number of half-cycles that indicate series arcing occur within a predetermined time interval, then the processor 72 causes the output 76 to trip open the separable contacts 52.

EXAMPLE 5

The minimum detector 66 is an analog minimum detector structured to reject discretely spaced, high frequency pulses of the sensed broadband noise 64. The discretely spaced, high frequency pulses of the sensed broadband noise 64 can be generated by one of a universal motor (e.g., in connection with FIG. 1) and a power supply (e.g., in connection with FIG. 2). The analog minimum detector is structured to pass relatively long-lived, high frequency pulses of the sensed broadband noise 64 from an arc fault condition (e.g., in connection with FIG. 3). Conversely, the analog minimum detector is structured to reject the discretely spaced, relatively short-lived, high frequency pulses of "safe" arcs.

EXAMPLE 6

As shown in FIG. 4, the arc fault detector 56 can include a line (e.g., without limitation, 60 Hz) current sensor 80 including an output 82 structured to output a signal 84 proportional to line current. One of the inputs 74 of the processor 72 is the line current sensor output 82. The processor 72 includes an analog-to-digital converter (ADC) 86 structured to input and periodically convert the line current sensor output 82.

EXAMPLE 7

The arc fault detector 56 can include a line voltage (e.g., without limitation, line-to-neutral) zero crossing detector 88 structured to synchronize the processor 72 with a line voltage.

EXAMPLE 8

The processor 72 can include an ADC 90 structured to input and convert the minimum detector output 70.

EXAMPLE 9

The processor can include a routine 92 (FIGS. 9A-9B) structured to input and reset the minimum detector output 70 a plurality of times for each of the line half-cycles. Hence, the analog minimum detector output 70, which tracks the minimum value of the demodulating logarithmic amplifier output 65, is periodically input by the processor 72 using the ADC 90. The minimum detector 66 can be reset by the output 94 of the processor 72.

EXAMPLE 10

The minimum detector output 70 is proportional to the minimum of the logarithm of the envelope of the sensed broadband noise 64. The minimum detector output 70 is structured to increase in response to continuous broadband noise from an arc fault condition. Conversely, the minimum detector output 70 is structured to not increase in response to non-continuous broadband noise from a "safe" arc.

EXAMPLE 11

As will be discussed below in connection with FIGS. 9A, 9B, 10A, 10B, 11A, 11B and 11C, the processor 72 is structured to determine if a predetermined number of alternating current half-cycles indicates series arcing occurring within a predetermined time interval, and to responsively set the processor output 76 to responsively trip open the separable contacts 52.

EXAMPLE 12

Figure 5:
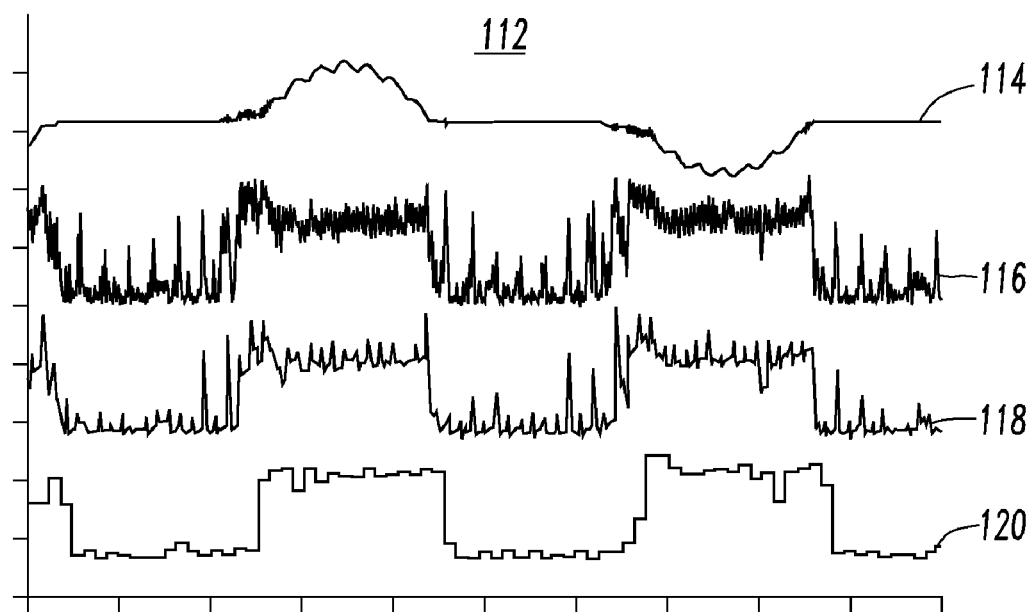
FIG. 5 is a plot of line current, logarithm of demodulated broadband power line noise, output of a minimum detector, and analog-to-digital converted minimum detector output for power line noise produced by an arc in series with a commutating motor.

FIG. 5 shows how the example demodulating logarithmic amplifier 60 cooperates with the minimum detector 66 of FIG. 4 to reject signatures of safe arcs (e.g., without limitation, motor commutation noise) while passing signals that may indicate hazardous series arcing.

Using information from the line-to-neutral voltage zero crossing detector 88 of FIG. 4, the processor 72 synchronizes, in order that it samples the minimum detector output 70 with the ADC 90 and resets the minimum detector 66, for example and without limitation, 32 times per half-cycle, although any suitable rate of reset may be employed. Commutation noise from the handheld sander is detected by the demodulating logarithmic amplifier 60. However, the commutation noise is limited to bursts of relatively short duration, none of which lasts longer than, for example, 1/32 of a half-cycle. Consequently, the analog minimum detector output 70 and the analog values sampled by the processor ADC 90 track the minimum of the commutation noise of the handheld sander, which is approximately equal to the noise "floor" in a distribution feeder (not shown) (i.e., the minimum detector output 70 when there is no arcing current or other broadband noise source on the distribution feeder).

EXAMPLE 13

In FIG. 5, noise from an arc in series with the same suitable handheld sander (not shown) is detected by the demodulating logarithmic amplifier 60. An arc in series with the handheld sander is produced by the opposing electrode arc generator (not shown) of UL1699. The plot 112 of FIG. 5 includes line current 114, logarithm 116 of demodulated broadband power line noise, minimum detector output 118, and analog-to-digital converted minimum detector output 120. Here, the broadband noise from the arc is continuous and spans several minimum detector reset periods. Consequently, the minimum detector output 118 and the analog values sampled by the processor ADC 90 track the per-sample minimum of the noise from the series arc, which is clearly higher than the no-current noise "floor" of the distribution feeder (not shown).

EXAMPLE 14

Figure 6:
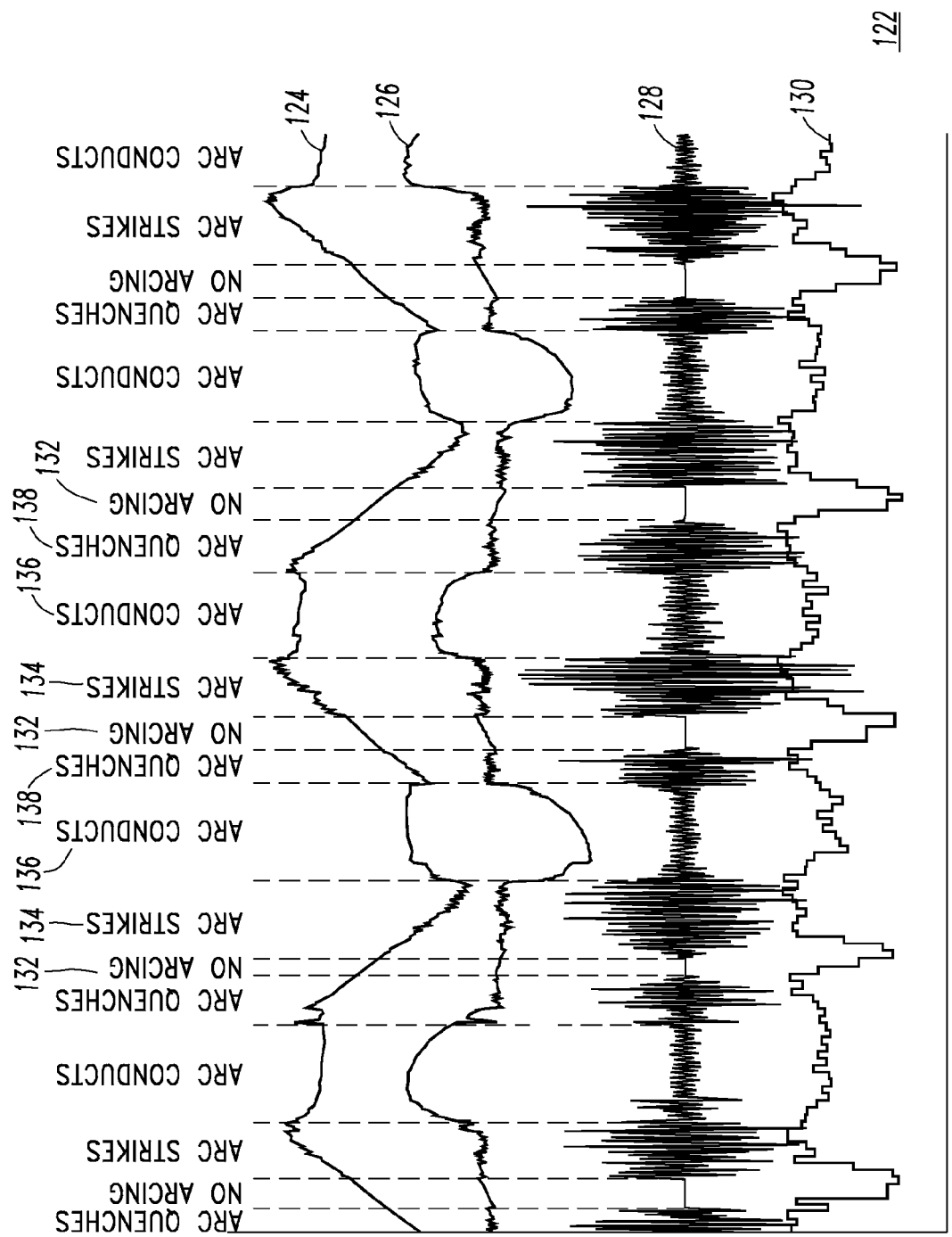
FIG. 6 is a plot of arc voltage, arc current, broadband noise measured by a tuned current sensor, and output of a minimum detector for an arc in series with a resistive load.

FIG. 6 shows the properties of broadband noise generated by series arcs in AC systems including the alternating current line current (e.g., 60 Hz) of an arc in series with a 5 ARMS resistive load (not shown) (e.g., an arc in series with such resistive load and generated using the carbonized path method of UL1699). The plot 122 of FIG. 6 includes the arc voltage 124 across the series arc (not shown), the arc current 126, broadband noise 128 output by the tuned current sensor 58 of FIG. 4, and the minimum detector output 130 (e.g., 70 of FIG. 4). When the AC power source voltage is insufficient to sustain a series arc, there is a period during which the arc voltage equals the AC source voltage and there is little line current and no broadband noise (shown as "No arcing" 132). As the AC power source voltage increases and approaches the minimum voltage needed to sustain a series arc, a period of pronounced broadband noise occurs (shown as "Arc strikes" 134). When the AC power source voltage becomes sufficiently high, the arc voltage clamps at about 30 to 40 VDC, the series arc begins to conduct and there is a period of reduced, continuous broadband noise (shown as "Arc conducts" 136). As the AC power source voltage falls and approaches the minimum voltage needed to sustain an arc, a second period of pronounced broadband noise occurs (shown as "Arc quenches" 138). Eventually, the AC power source voltage falls below the minimum arc voltage and the line current and broadband noise cease (shown as "No arcing" 132). Thus, it will be apparent from FIG. 6 that the broadband noise associated with series arcing modulates periodically with the AC power source voltage.

The minimum detector output 70 as sampled by the processor 72 of FIG. 4 is also shown at 130 in FIG. 6. This output 70,130 is proportional to the minimum of the logarithm of the envelope of the sensed broadband noise 64. The minimum detector output 70 "rises" when there is continuous broadband noise, indicating arcing, and does not "rise" when there is no continuous broadband noise and series arcing. Thus, the modulation of the broadband noise emitted by series arcs is reflected in a periodic rise and fall in the response of the minimum detector 66. The unusual profile of the broadband noise associated with series arcing is also believed to be determined primarily by properties of the arc (e.g.; strike; conduction; quenching) and is ideally independent of the type of load.

EXAMPLE 15

For each of FIGS. 7A, 7B, 8A and 8B, the plots each represent a fault event composed of many half-cycles.

Figure 7A:
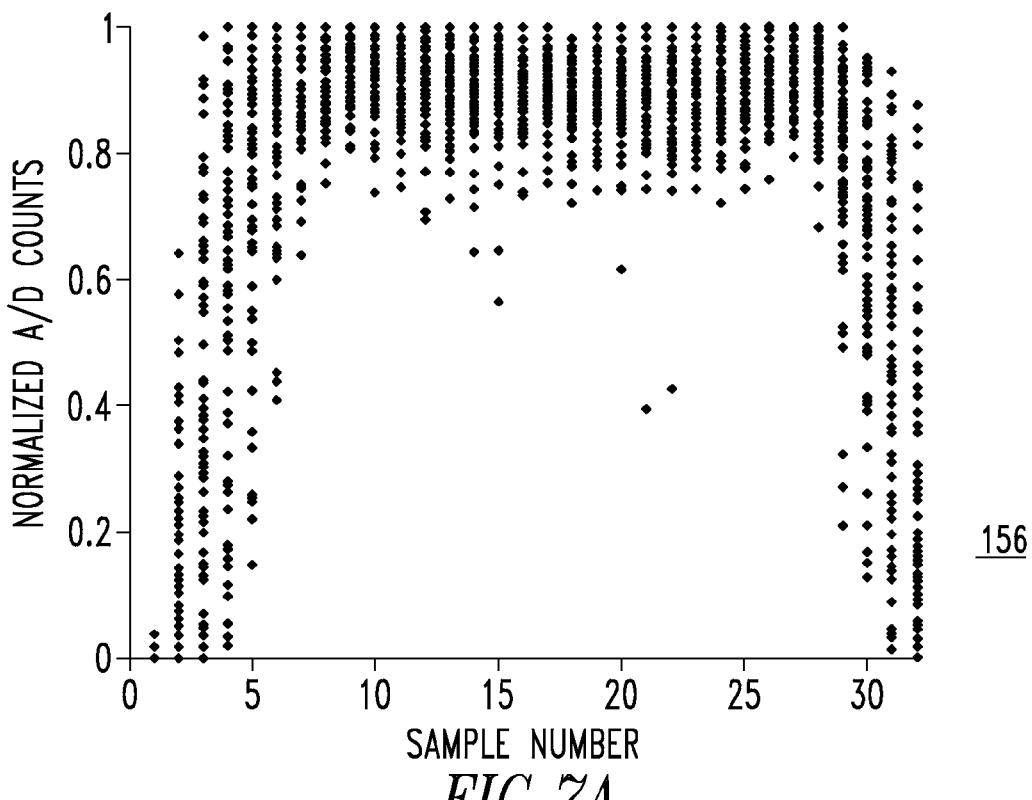
FIG. 7A is a plot of 32 sample periods of an alternating current half-cycle versus counts of the output of a minimum detector for a series arc event, which is normalized by the maximum and minimum values of counts that occurred during the half-cycle.

FIG. 7A is a plot 156 of 32 sample periods of an alternating current half-cycle versus counts of the minimum detector output 70 for a series arc event, which is normalized by the maximum and minimum values of counts that occurred during each half-cycle.

Figure 7B:
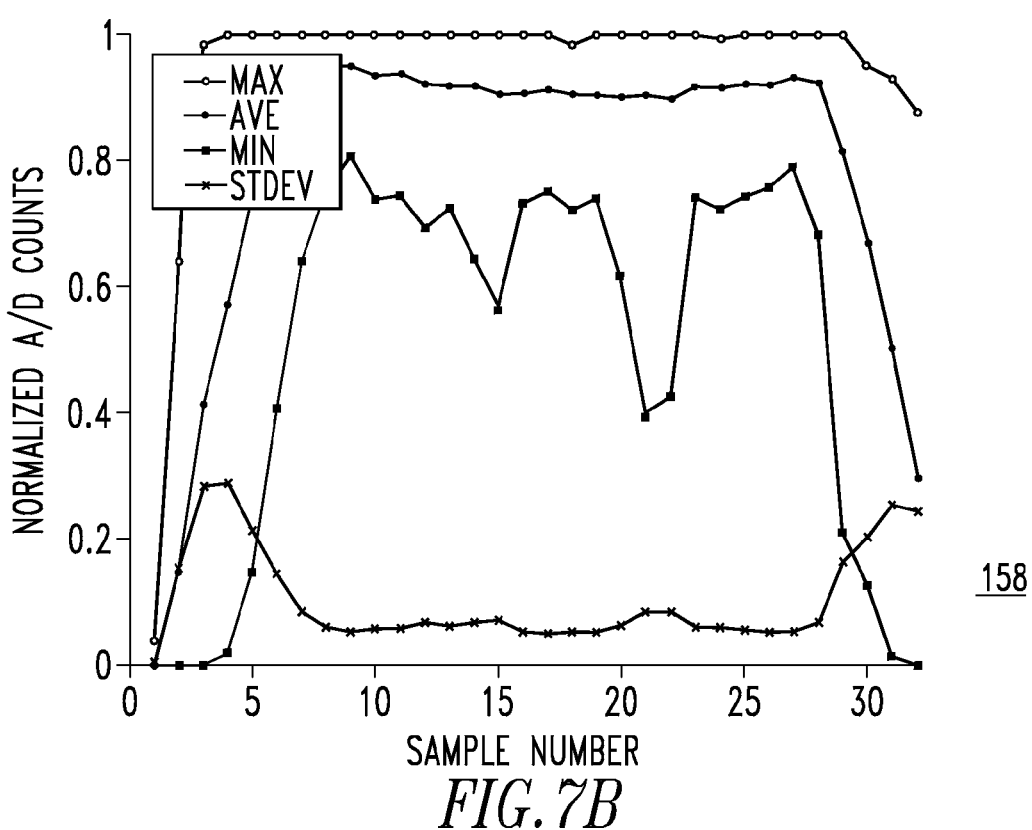
FIG. 7B is a plot of 32 sample periods of an alternating current half-cycle versus counts of the output of a minimum detector for a series arc event including maximum, average, minimum and standard deviation values, which is normalized by the maximum and minimum values of counts that occurred during the half-cycle.

FIG. 7B is a plot 158 of 32 sample periods of an alternating current half-cycle versus counts of the minimum detector output 70 for a series arc event including maximum, average, minimum and standard deviation values, which is normalized by the maximum and minimum values of counts that occurred during each half-cycle.

FIGS. 7A-7B show statistical analysis of the response of the minimum detector 66 of FIG. 4 to a series arc. The processor 72 of FIG. 4 samples 32 times per half-cycle the minimum detector output 70 synchronously with the AC power source. For example and without limitation, sample #1 occurs at around 0 electrical degrees of the line-to-neutral voltage, and sample #2 occurs at about 5.625 electrical degrees. In FIGS. 7A-7B, the horizontal axis corresponds to the sample periods #1 through #32 of the processor 72 and the vertical axis corresponds to the minimum detector output 70 as measured by the processor 72 in units of normalized ADC counts (FIGS. 7A and 7B).

From the plot 156 of FIG. 7A, it can be seen that during this particular series arc test, the minimum detector output 70 follows approximately the same profile for each half-cycle during the series arc event. This time profile is analogous to what is shown in FIG. 6 in which the series arc repeats a pattern of "no arcing" 132 followed by a period of "arc strikes" 134, "arc conducts" 136, "arc quenches" 138, and finally returning to a period of no arcing 132 for each half-cycle of line-to-neutral voltage.

Some statistical measures (e.g.; maximum; average; minimum; standard deviation) of the minimum detector output 70 in units of normalized counts of the ADC 90 versus the sampling period are shown in the plot 158 of FIG. 7B. The standard deviation of the series arc profile is quite low compared to the average, which indicates that the minimum detector output 70 is fairly uniform from half-cycle to half-cycle during this series arc. Interestingly, the standard deviation is greatest at around samples #2 and #31, which implies that the greatest variability in the minimum detector output 70 coincides with the transition from "no arcing" 132 to "arc strikes" 134 and from "arc quenches" 138 to "no arcing" 132.

From the plot 156 of FIG. 7A, it can be seen that during this particular series arc, the lowest value of the minimum detector output 70 generally occurs at one of samples #1, #2 or #31, and the normalized value of the minimum detector output 70 during arc conduction (e.g., approximately sample #4 through sample #30) was generally greater than about 50%.

EXAMPLE 16

Figure 8A:
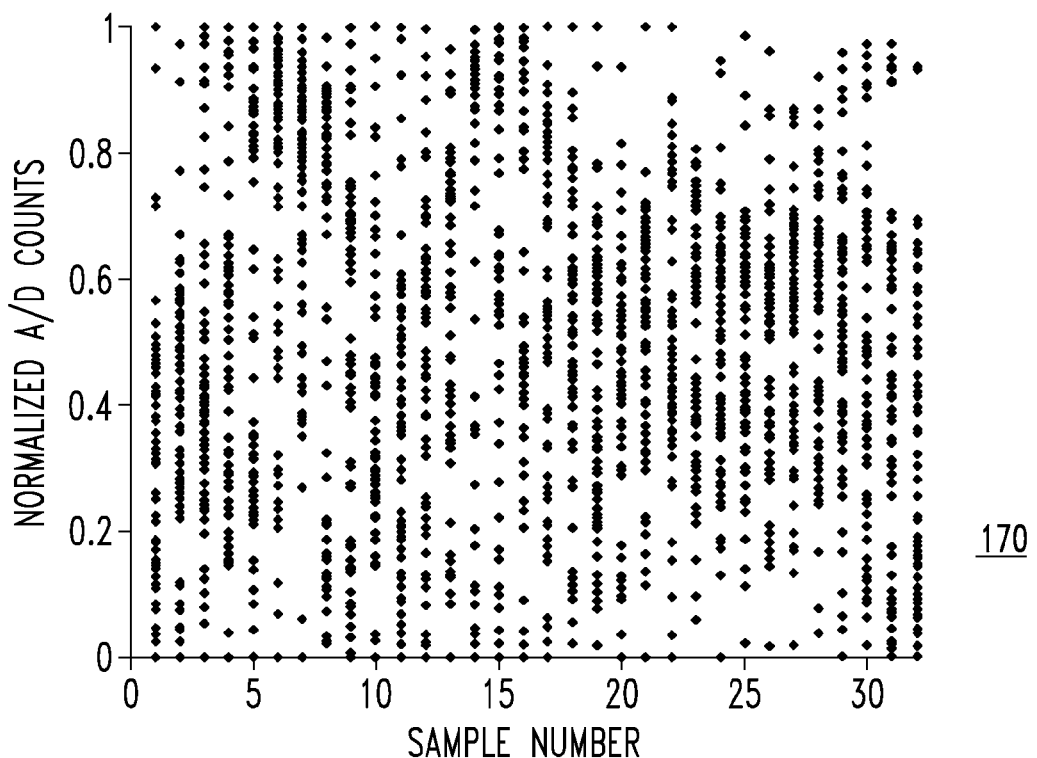
FIG. 8A is a plot of 32 sample periods of an alternating current half-cycle versus counts of the output of the minimum detector for a starting transient of a pair of fluorescent bulbs with a magnetic ballast, which is normalized by the maximum and minimum values of counts that occurred during the half-cycle.
Figure 8B:
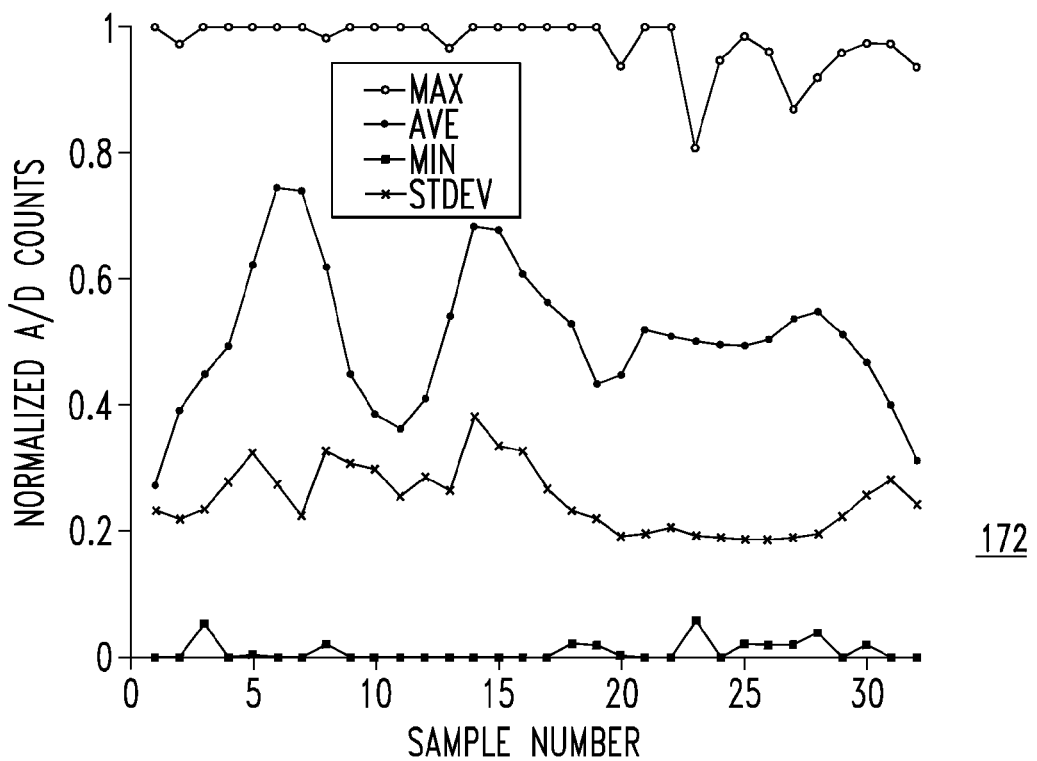
FIG. 8B is a plot of 32 sample periods of an alternating current half-cycle versus counts of the output of the minimum detector for a starting transient of a pair of fluorescent bulbs with a magnetic ballast including maximum, average, minimum and standard deviation values, which is normalized by the maximum and minimum values of counts that occurred during the half-cycle.
Figure 9A:
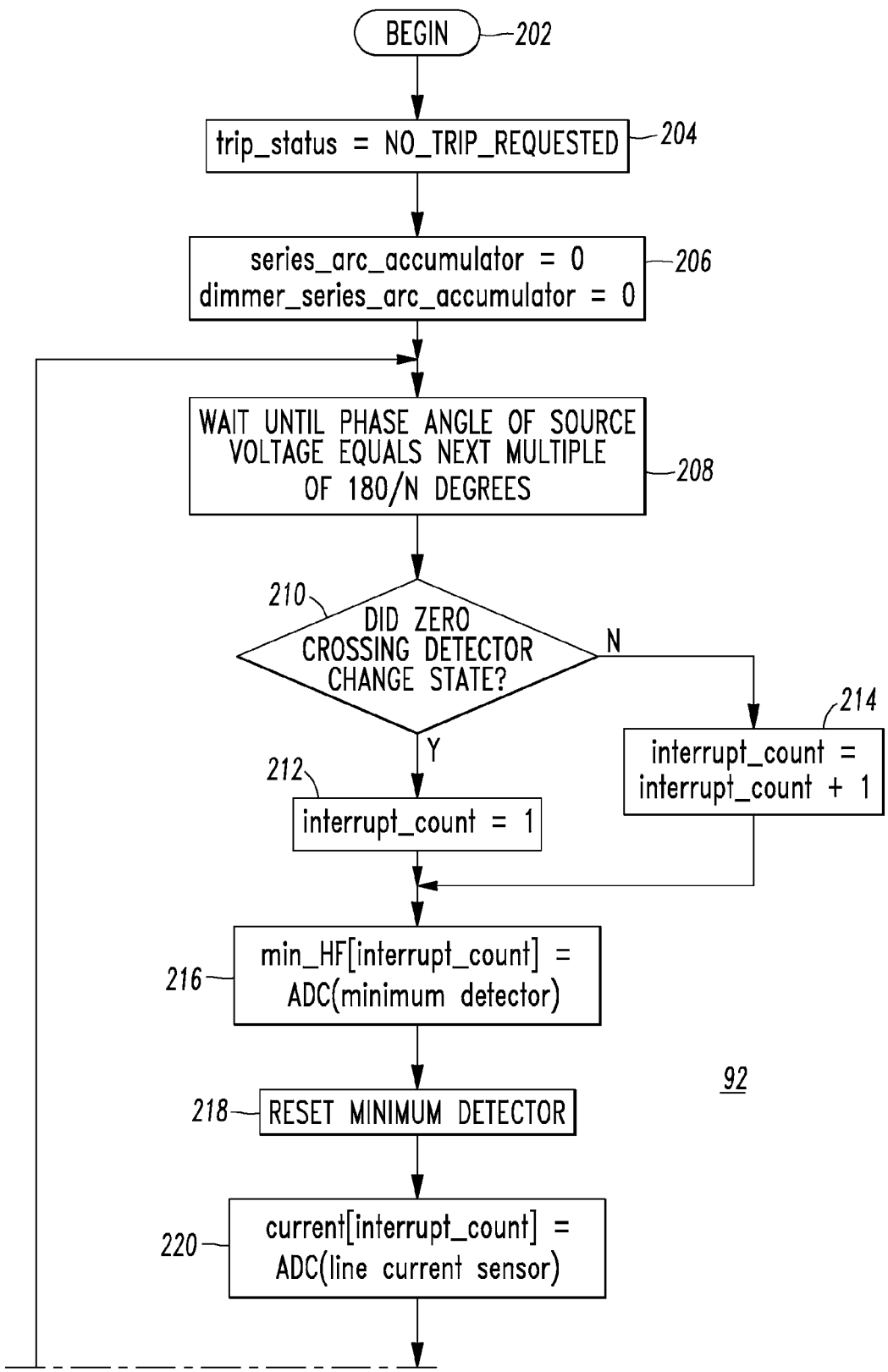
FIGS. 9A, 9B, 10A, 10B, 11A, 11B and 11C are flowcharts of routines for the processor of FIG. 4.
Figure 9B:
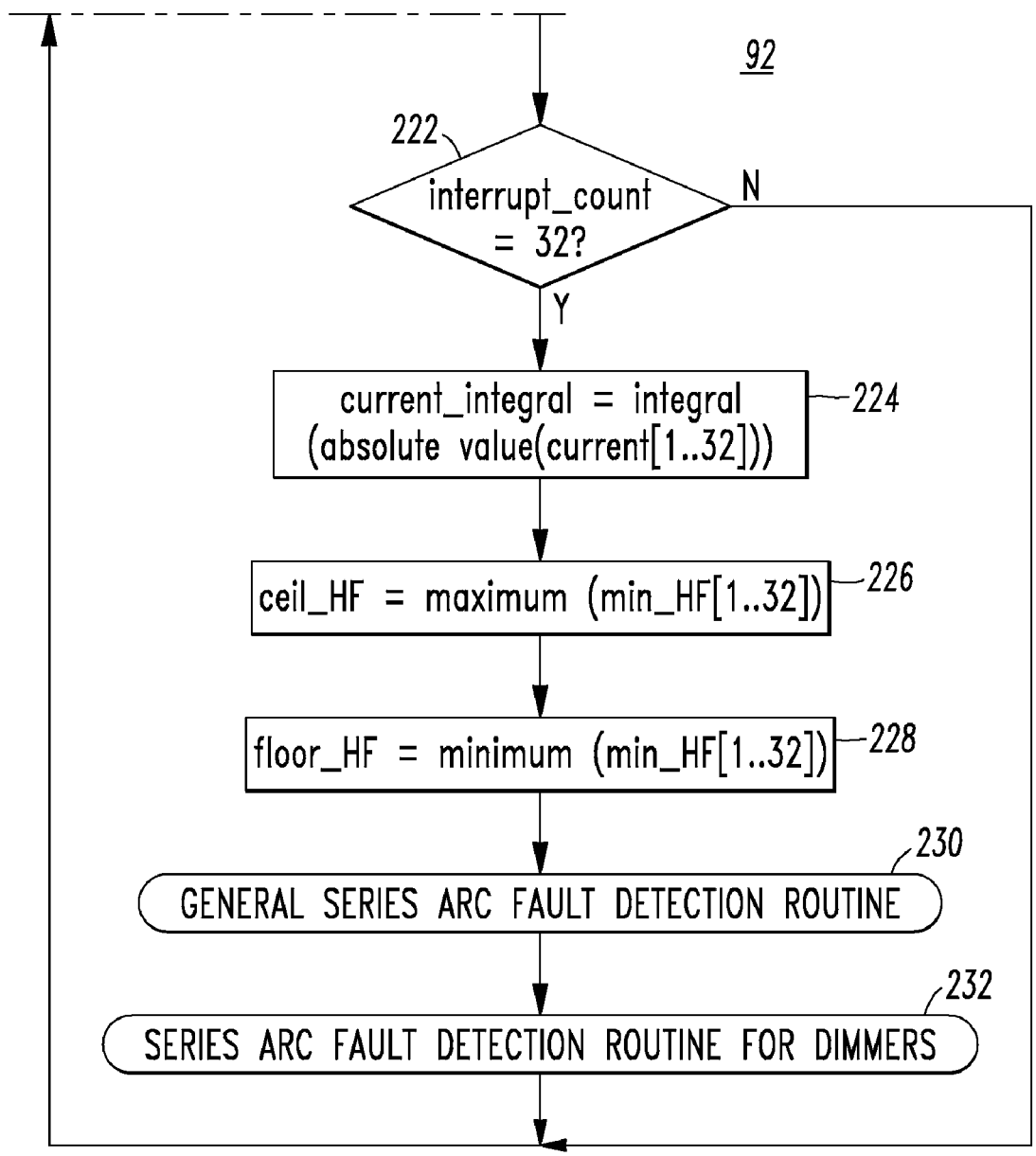

By way of comparison, data from the starting transient of a pair of fluorescent bulbs with a magnetic ballast (not shown) is shown in FIGS. 8A and 8B. Unlike the universal motors considered earlier, the fluorescent bulbs with a magnetic ballast draw continuous bursts of random, broadband current, which bursts persist for an appreciable portion of each half-cycle of the electrical source.

FIG. 8A is a plot 170 of 32 sample periods of an alternating current half-cycle versus counts of the minimum detector output 70 for the starting transient, which is normalized by the maximum and minimum values of counts that occurred during each half-cycle.

FIG. 8B is a plot 172 of 32 sample periods of an alternating current half-cycle versus counts of the minimum detector output 70 for the starting transient including maximum, average, minimum and standard deviation values, which is normalized by the maximum and minimum values of counts that occurred during each half-cycle.

As shown in FIG. 8A, the peak of the minimum detector response to the fluorescent bulbs is similar to the amplitude of the response to the series arc. However, if the same statistical analysis applied earlier (FIG. 7B) to the series arc is applied to the fluorescent bulbs, it is clear that the broadband noise emitted by the fluorescent bulbs does not exhibit a modulation that is periodic with the source voltage, but is instead apparently random.

EXAMPLE 17

Figure 10A:
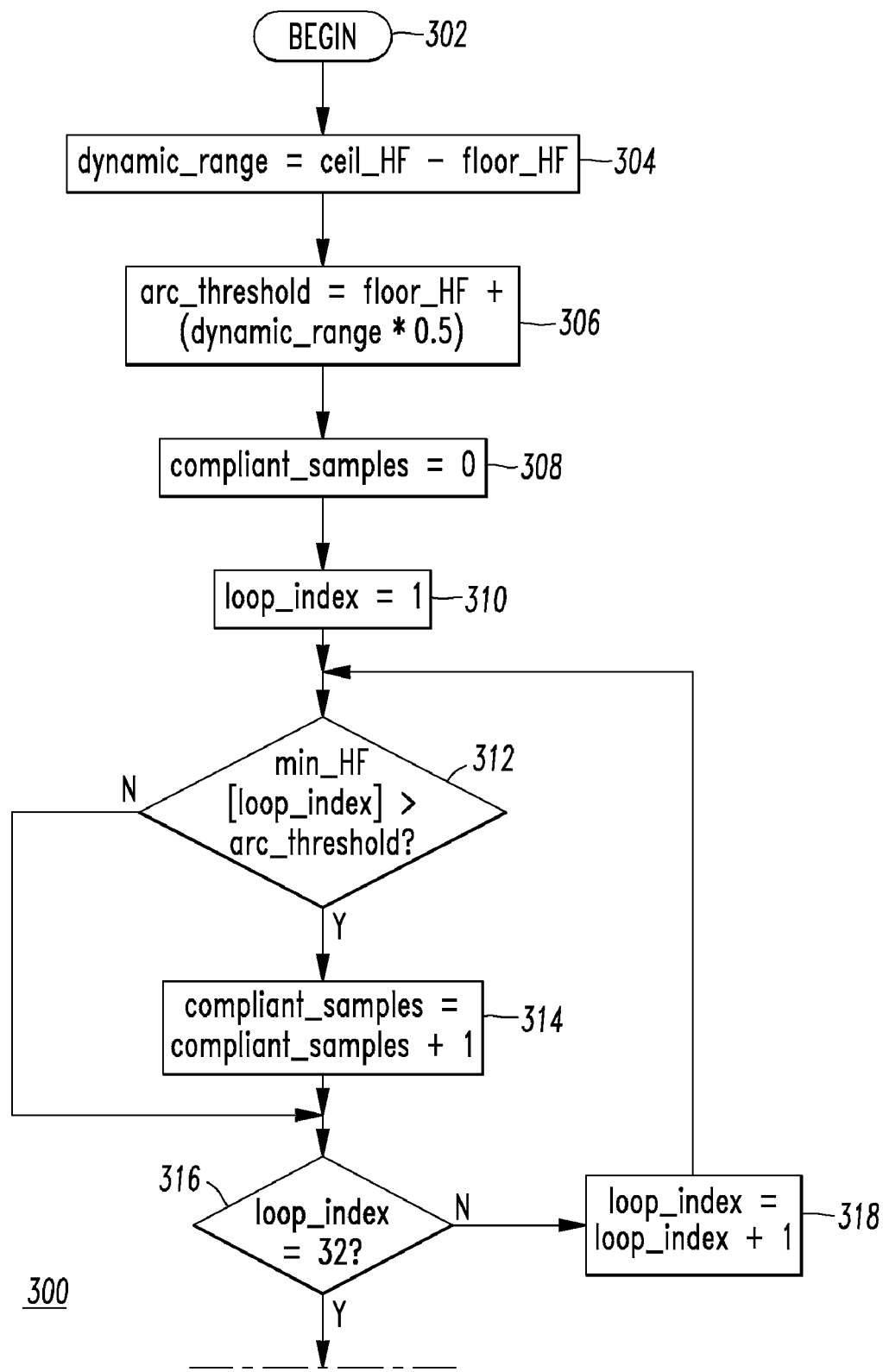
Figure 10B:
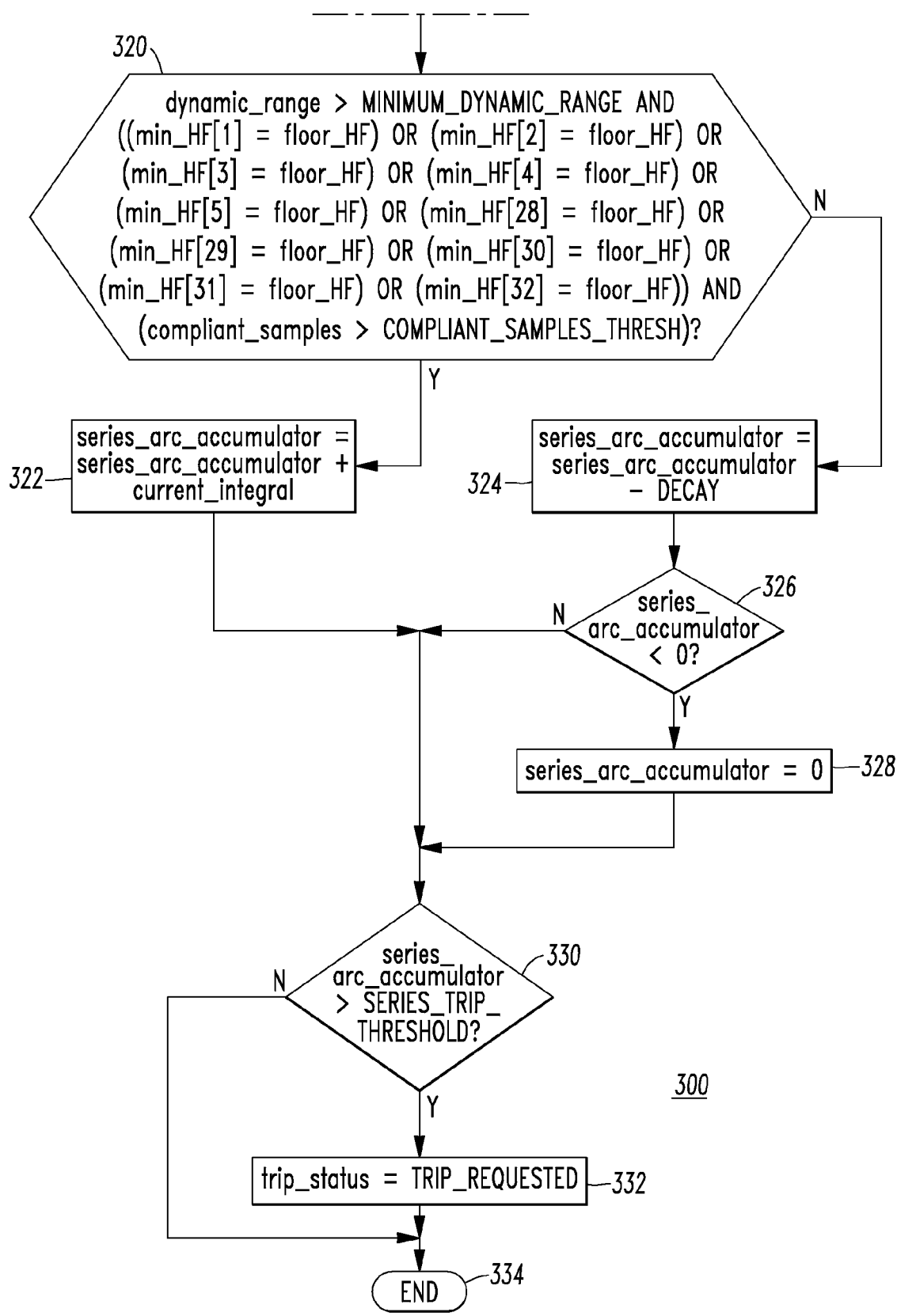
Figure 11A:
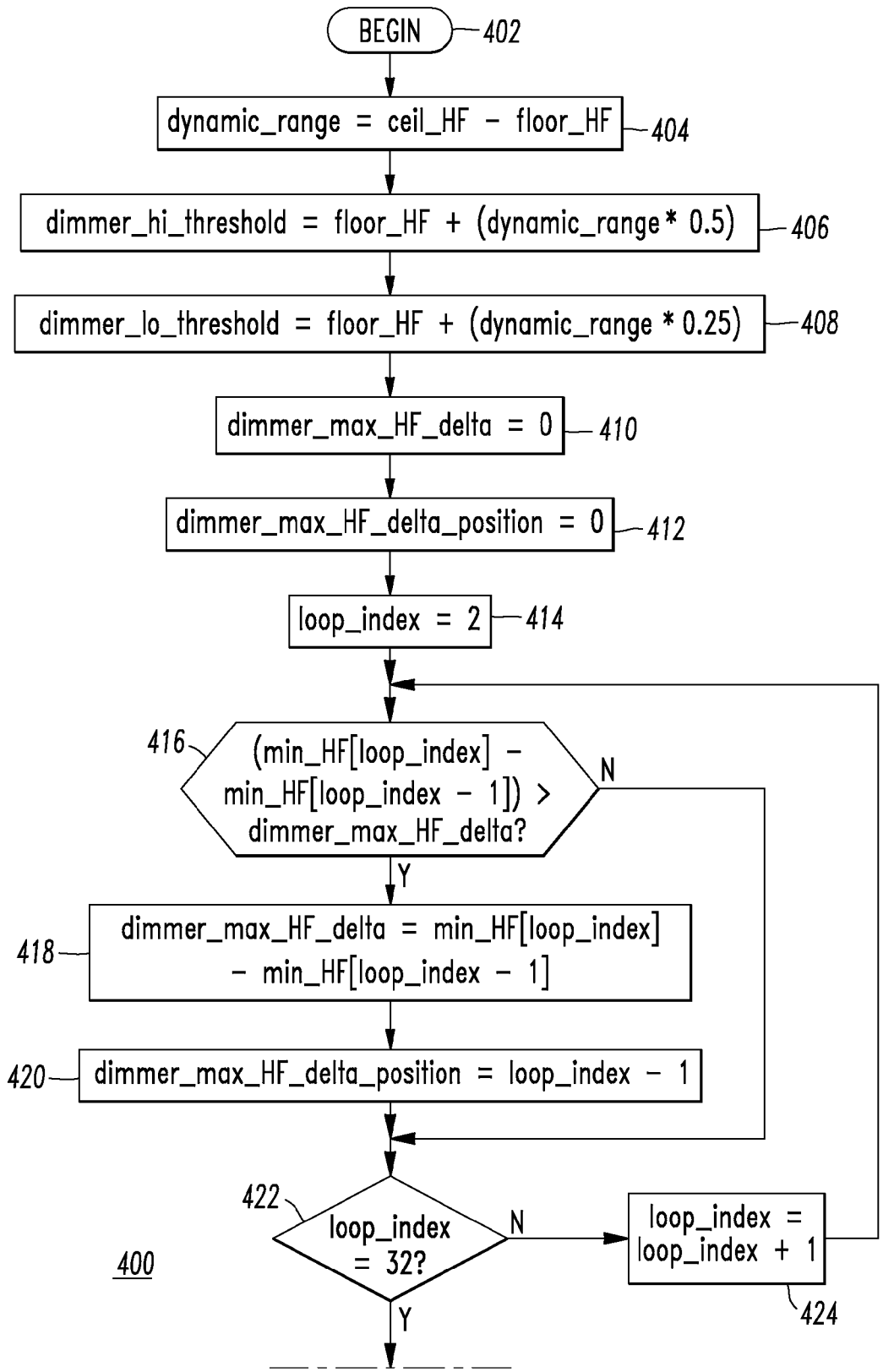
Figure 11B:
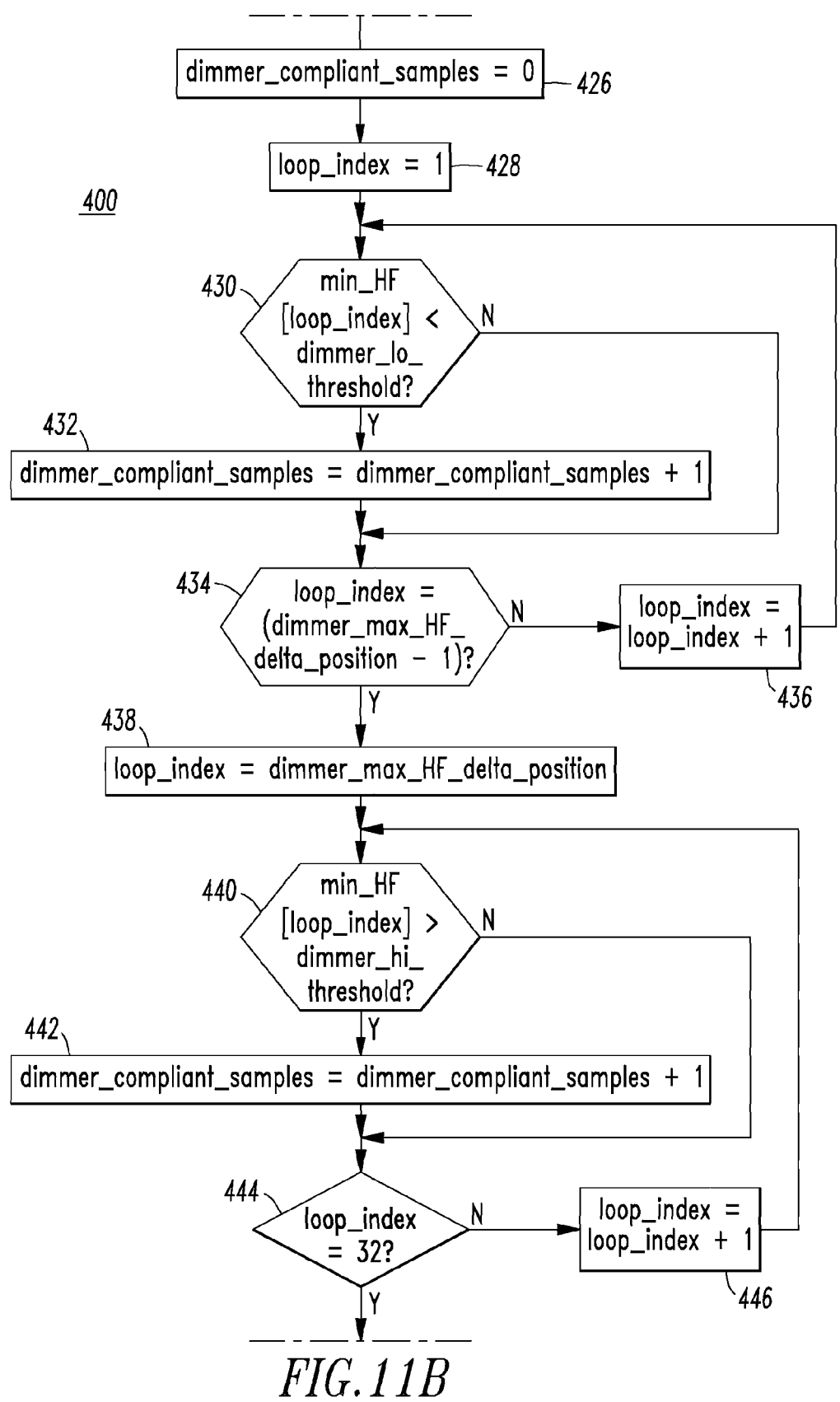
Figure 11C:
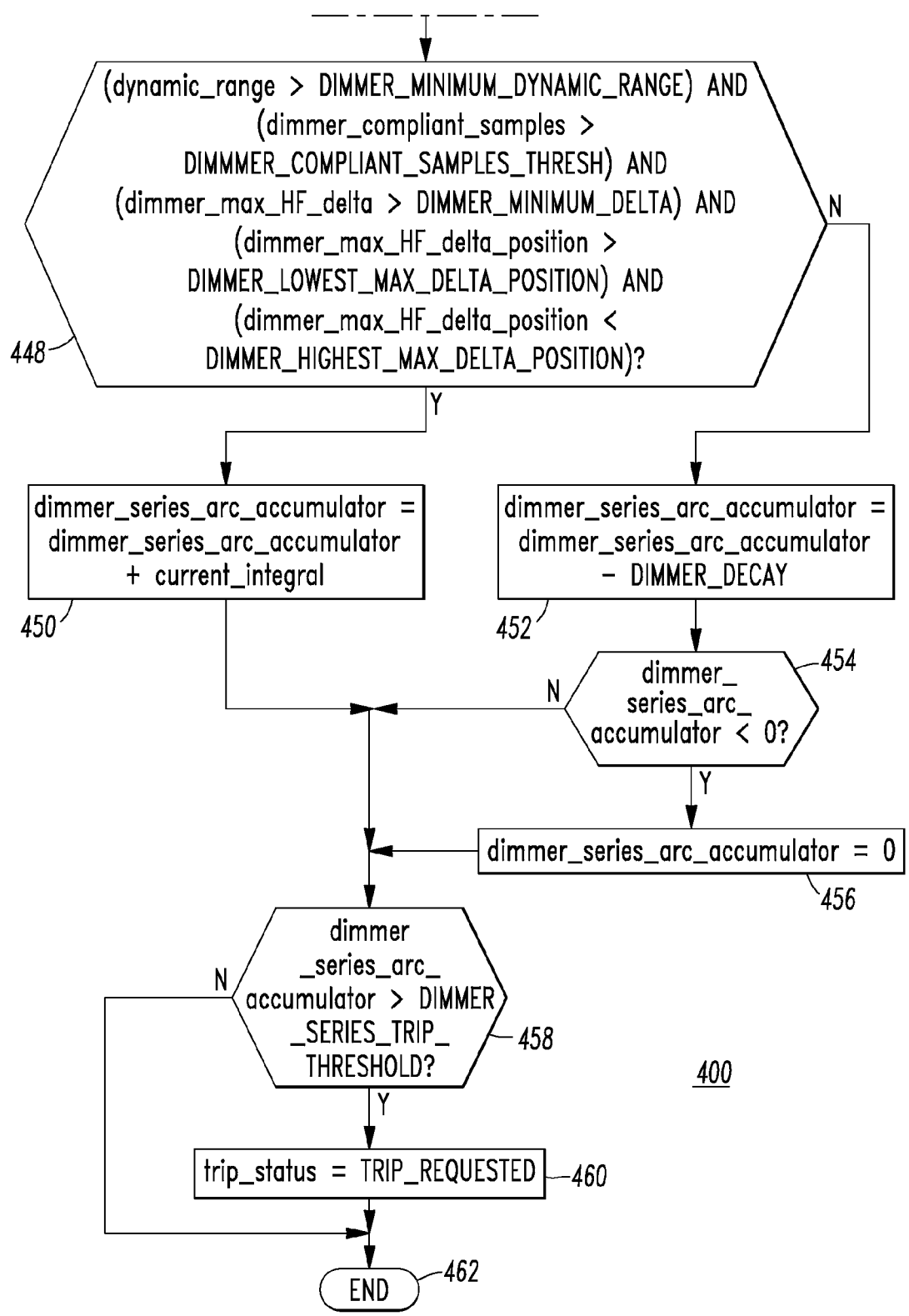

FIGS. 9A, 9B, 10A, 10B, 11A, 11B and 11C form a flowchart of routines 92,300,400 for series arc fault detection. The routine 92 of FIGS. 9A and 9B begins a main loop at 202. Next, at 204, hardware circuitry of FIG. 4 is reset and a variable trip_status is reset to a non-trip state. Then, at 206, other variables are reset including variables series_arc_accumulator (FIGS. 10A-10B) and dimmer_series_arc_accumulator (FIGS. 11A-11C). Next, at 208, the routine 92 waits until the phase angle of the source voltage equals the next multiple of 180/N degrees (e.g., without limitation, N=32). Then, at 210, it is determined if the zero crossing detector 88 has changed state. If so, then the variable interrupt_count is set to one at 212. Otherwise, the variable interrupt_count is incremented at 214.

After either 212 or 214, at 216, an array min_HF is updated with the current digital value from the ADC 90 for the minimum detector output 70. Then, at 218, the minimum detector 66 is reset by pulsing processor output 94. Next, at 220, an array, current, is updated with the current digital value from the ADC 86 for the signal 84 from the line current sensor 80. At 222, it is determined if the variable interrupt_count is equal to 32. If not, then execution resumes at 208. Otherwise, at 224, a variable current_integral (employed at 322 of FIGS. 10B and 450 of FIG. 11C) is calculated as the integral of the absolute value of the array current[1 . . . 32]. Next, at 226 and 228, a variable ceil_HF is set to the maximum of the array min_HF[1 . . . 32], and a variable floor_HF is set to the minimum of the array min_HF[1 . . . 32], respectively. Then, at 230 and 232, the general series arc fault detection routine 300 (FIGS. 10A-10B) and the series arc fault detection routine 400 for dimmers (FIGS. 11A-11C) are respectively run. After 232, execution resumes at 208.

As can now be appreciated, at 224, the routine 92 calculates the integral of the absolute value of the data stored in the line current array. Next, at 226 and 228, the routine 92 determines the maximum and minimum values of the array of sampled minimum detection outputs, which are referred to as the "ceiling" (ceil_HF) and "floor" (floor_HF) of the minimum detector output 70.

Referring to FIGS. 10A-10B, the general series arc fault detection routine 300 begins at 302. Next, at 304, a variable dynamic_range is set to be the difference of the variables ceil_HF less floor_HF. This provides a measure of the dynamic range of the minimum detector output 70. Then, at 306, the variable arc_threshold is set equal to the sum of floor_HF plus one-half of dynamic_range, although any suitable threshold can be employed. In this example, the series arc_threshold is calculated by determining a value which is the average of the minimum detector ceiling and floor. For example, the series arc threshold can be chosen below the observed average value of the minimum detector 66 during arc conduction, with enough margin above the noise floor to exclude spurious noise.

Next, at 308 and 310, variables compliant_samples and loop_index are initialized to zero and one, respectively. At 312, it is determined if the array value min_HF as indexed by loop_index is greater than the variable arc_threshold. If so, then the count compliant_samples is incremented at 314. Otherwise, or after 314, it is determined if loop_index is equal to 32, at 316. If not, then loop_index is incremented, at 318, after which step 312 is repeated.

On the other hand, if loop_index is equal to 32, then at 320, a test is performed to determine if the variable series_arc_accumulator should be increased or decreased, as will be discussed. The test is met if three conditions are true: (1) the variable dynamic_range is greater than a predetermined value (e.g., without limitation 30; any suitable value); (2) the variable floor_HF occurs at one of the samples #1 through #4 or samples #29 through #32 of the array min_HF; and (3) the count of compliant_samples is greater than a predetermined value (e.g., without limitation 24; any suitable value). Then, if the test at 320 is met, the variable series_arc_accumulator is increased by the variable current_integral of step 224 of FIG. 9B at 322 of FIG. 10B. Otherwise, the variable series_arc_accumulator is decreased by a predetermined value (e.g., without limitation 50; any suitable value) at 324. After 324, at 326, it is determined if the variable series_arc_accumulator is less than zero. If so, then the variable series_arc_accumulator is set to zero at 328. Otherwise, or after 322 or 328, at 330, it is determined if the variable series_arc_accumulator is greater than a predetermined value (e.g., without limitation 2000; any suitable value) at 330. If so, then the variable trip_status is set to request a trip at 332 (e.g., by setting the digital output 76 of FIG. 4). Otherwise, or after 332, the routine 300 ends at 334.

As can now be appreciated, the loop at even steps 312-318 scans samples #1 through #32 of the minimum detector array min_HF and counts those samples that are greater than the series arc threshold. The three-part test at 320 determines whether the minimum detector data indicates a series arc during this particular half-cycle. First, the dynamic range of the minimum detector output 70 exceeds some predetermined minimum value. If a series arc is present, then the broadband noise 128 of the load current will vary widely, as can be seen in FIG. 6. In particular, the broadband noise during the "strike" and "quench" intervals 134,138 should be much greater than the broadband noise "floor", which occurs during the "no arcing" interval 132.

Second, the floor value of the minimum detector 66 occurs during samples #1 through #4 or samples #29 through #32. If a series arc is present, a minimum broadband noise (as indicated by the floor of the minimum detector 66) should correspond with the "no arcing" interval 132, which roughly coincides with the zero crossings of the line-to-neutral voltage.

Third, if a series arc is present, then all of the minimum detector samples #5 through #28 (e.g., COMPLIANT_SAMPLES_THRESH=24) should be greater than the series arc threshold (which, in this example, is the average of the ceiling and floor values of the minimum detector array HF_min). This, working in cooperation with the minimum detector 66, ensures that continuous broadband noise is present throughout the expected series arc conduction period.

If the test at 320 of FIG. 10B is true, then the integral of the absolute value of the line current for that half-cycle is added to the series arc accumulator, which is intended to accrue in proportion to the line current (and consequently the energy) dissipated by any series arc. Otherwise, if any condition of the test is not true, then the series arc accumulator is decreased, but is not allowed to become negative.

The phase angle of a series arc (i.e., the position of arc quenches 138, no arcing 132, and arc strikes 134 of FIG. 6) changes relative to the line-to-neutral voltage depending on whether the load has a capacitive or inductive component, or is purely resistive. Plots for inductive/capacitive loads (not shown) show that the log HF minimum profile for an arc in series with inductive/capacitive loads is basically the same as the log HF minimum profile for an arc in series with a resistive load, just phase-shifted accordingly. The disclosed general series arc fault detection routine 300 of FIGS. 10A-10B advantageously detects arcs in series with loads having inductive and capacitive components by allowing the position of the HF minimum to occur in about any of the samples #1 through #4 or about any of the samples #29 through #32. In contrast, for a purely resistive load, the HF minimum exhibits generally a unity power factor for which the HF minimum occurs at about samples #1 through #3, or at about samples #31 or #32. For an arc in series with an air compressor, there is generally a lagging power factor that is caused by the inductive nature of the motor that drives the air compressor. There, the HF minimum occurs at about samples #1 through #5. For an arc in series with a group of computer power supplies, there is generally a leading power factor that is caused by the capacitive nature of those power supplies. There, the HF minimum occurs at about samples #28 through #32.

Referring to FIGS. 11A-11C, the series arc fault detection routine 400 for dimmers is shown. Basically, for an arc in series with dimmers with incandescent lighting loads (not shown), the log HF minimum signal is high whenever the dimmer conducts alternating current line current. This routine 400 seeks to detect this characteristic, which the general routine 300 of FIGS. 10A-10B cannot.

The routine 400 begins at 402. Next, at 404, a variable dynamic_range is set to be the difference of the variables ceil_HF less floor_HF. This provides a measure of the dynamic range of the minimum detector output 70. Then, at 406 and 408, the variable dimmer_hi_threshold is set equal to the sum of floor_HF plus one-half of dynamic_range, and the variable dimmer_lo_threshold is set equal to the sum of floor_HF plus one-quarter of dynamic_range, respectively, although any suitable thresholds can be employed. Next, at 410 and 412, the variables dimmer_max_HF_delta and dimmer_max_HF_delta_position are respectively set to zero. Then, the variable loop_index is set to 2 at 414.

At 416, it is determined if the difference between two subsequent values of the array min_HF as indexed by loop_index and loop_index-1 is greater than the variable dimmer_max_HF_delta. If so, then the variable dimmer_max_HF_delta is set equal to that difference, at 418, and the variable dimmer_max_HF_delta_position is set equal to the current value of loop_index-1, at 420. Otherwise, or after 420, it is determined if loop_index is equal to 32, at 422. If not, then loop_index is incremented, at 424, after which step 416 is repeated.

On the other hand, if loop_index is equal to 32, then at 426 and 428, the variable dimmer_compliant_samples is set equal to zero, and the variable loop_index is set equal to one, respectively. At 430, it is determined if the value of the array min_HF as indexed by loop_index is less than the variable dimmer_lo_threshold. If so, then the variable dimmer_compliant_samples is incremented at 432. Otherwise, or after 432, it is determined if loop_index is equal to the variable dimmer_max_HF_position-1, at 434. If not, then loop_index is incremented, at 436, after which step 430 is repeated. Otherwise, the variable loop_index is set to the variable dimmer_max_HF_delta_position, at 438.

Next, at 440, it is determined if the value of the array min_HF as indexed by loop_index is greater than the variable dimmer_hi_threshold. If so, then the variable dimmer_compliant_samples is incremented at 442. Otherwise, or after 442, it is determined if loop_index is equal to 32, at 444. If not, then loop_index is incremented, at 446, after which step 440 is repeated. Otherwise, at 448, a test is performed to determine if the variable dimmer_series_arc_accumulator should be increased or decreased. The test is met if five conditions are true: (1) the variable dynamic_range is greater than a predetermined value (e.g., without limitation 40; any suitable value); (2) the count of dimmer_compliant_samples is greater than a predetermined value (e.g., without limitation 27; any suitable value); (3) the variable dimmer_max_HF_delta is greater than a predetermined value (e.g., without limitation 25; any suitable value); (4) the variable dimmer_max_HF_delta_position is greater than a predetermined value (e.g., without limitation 2; any suitable value); and (5) the variable dimmer_max_HF_delta_position is less than a predetermined value (e.g., without limitation 25; any suitable value). Then, if the test at 448 is met, the variable dimmer_series_arc_accumulator is increased by the variable current_integral (step 224 of FIG. 9B) at 450. Otherwise, the variable dimmer_series_arc_accumulator is decreased by a predetermined value (e.g., without limitation 50; any suitable value) at 452. After 452, at 454, it is determined if the variable dimmer_series_arc_accumulator is less than zero. If so, then the variable dimmer_series_arc_accumulator is set to zero at 456. Otherwise, or after 450 or 456, at 458, it is determined if the variable dimmer_series_arc_accumulator is greater than a predetermined value (e.g., without limitation 3000; any suitable value) at 458. If so, then the variable trip_status is set to request a trip at 460 (e.g., by setting the digital output 76 of FIG. 4). Otherwise, or after 460, the routine 400 ends at 462.

When an arc occurs in series with incandescent lighting controlled by a dimmer, the width of the series arc no arcing interval (not shown, but see "no arcing" 132 of FIG. 6) and the position of the arc re-strike (not shown, but see "arc strikes" 134 of FIG. 6) is a function of the dimmer phase angle. Specifically, when the dimmer is set to conduct starting at a given phase angle, no series arcing occurs in the part of the half-cycle prior to that phase angle. Also, the onset of series arc conduction, which occurs at the dimmer phase angle setting, usually occurs with the largest positive step in the log HF minimum profile. Finally, the range of dimmer phase angle settings typically does not encompass the beginning and the end of each half-cycle. Each of these unique characteristics is employed in the test 448 of FIG. 11C to specifically trip in response to arcs in series with incandescent lighting loads controlled by dimmers.

EXAMPLE 18

Figure 12:
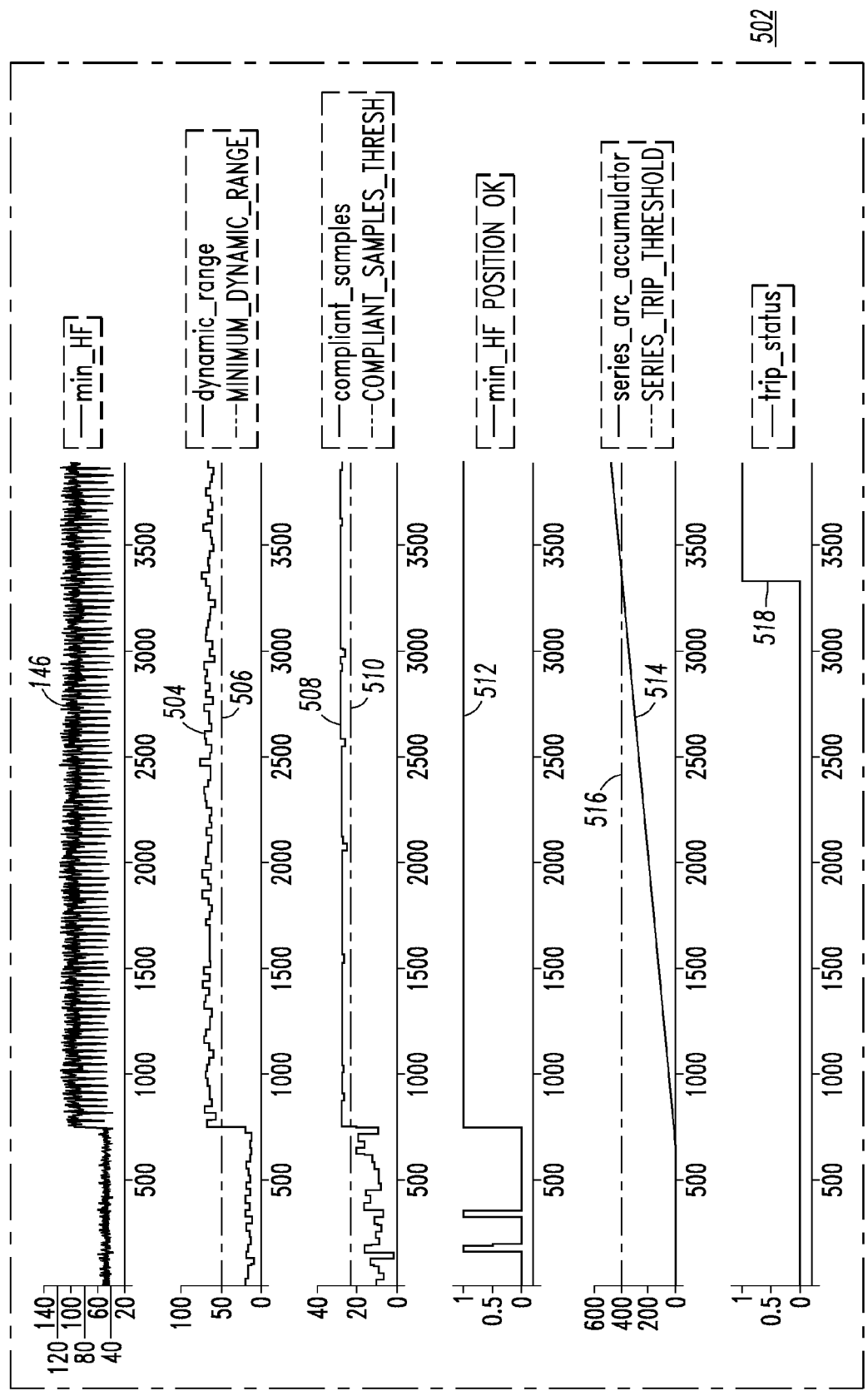
FIG. 12 is a plot of signals for an arc in series with a resistive load including the output of the minimum detector as sampled by the processor of FIG. 4, the dynamic range of the output of the minimum detector for each half-cycle and a threshold for the minimum dynamic range, a count of compliant samples which exceed an arcing threshold, whether the floor of the minimum detector value falls within the expected position for a particular half-cycle, the series arc accumulator, a trip threshold value, and a trip status signal.

Operation of the example series arc fault detection routines 92,300 (FIGS. 9A, 9B, 10A and 10B) in response to a conventional 5 ARMS series arc is shown in FIG. 12. The plot 502 of FIG. 12 shows the minimum detector output 146, as sampled by the processor 72, the dynamic range 504 of the minimum detector output 70 for each half-cycle (as calculated by the processor 72), a threshold 506 for the minimum dynamic range needed to indicate a potential series arc fault, and a count 508 of compliant samples (e.g., without limitation, between sample #1 and sample #32), which exceed the "arcing threshold", which (in this example) is the average of the minimum detector output ceiling and floor. The number of samples per half-cycle that comply with this condition exceed a predetermined amount 510 to indicate a potential series arc fault. The plot 502 also shows a trace 512, which shows whether the floor of the minimum detector value falls within the expected position for that particular half-cycle. In the trace 512, a "high" signal indicates the floor of the minimum detector 66 falls within the range of positions that indicate a potential series arc fault. The plot 502 further shows the series arc accumulator 514. If all the conditions are true (i.e., there is sufficient dynamic range; sufficient evidence of continuous detection over the expected range of samples; and the minimum value for the broadband noise profile falls within the expected range of positions), then the integrated value of the line current is added to this accumulator 514. Otherwise, the contents of the series arc fault accumulator 514 gradually decay to zero (not shown). The plot 502 also shows a "trip" threshold value 516, which, if exceeded by the value of the series arc accumulator 514, will cause the processor output 76 to issue a "trip request" 518 to the trip mechanism 78 to open the separable contacts 52 of FIG. 4 (see, for example, step 332 of FIG. 10B and step 460 of FIG. 11C).

EXAMPLE 19

Figure 13:
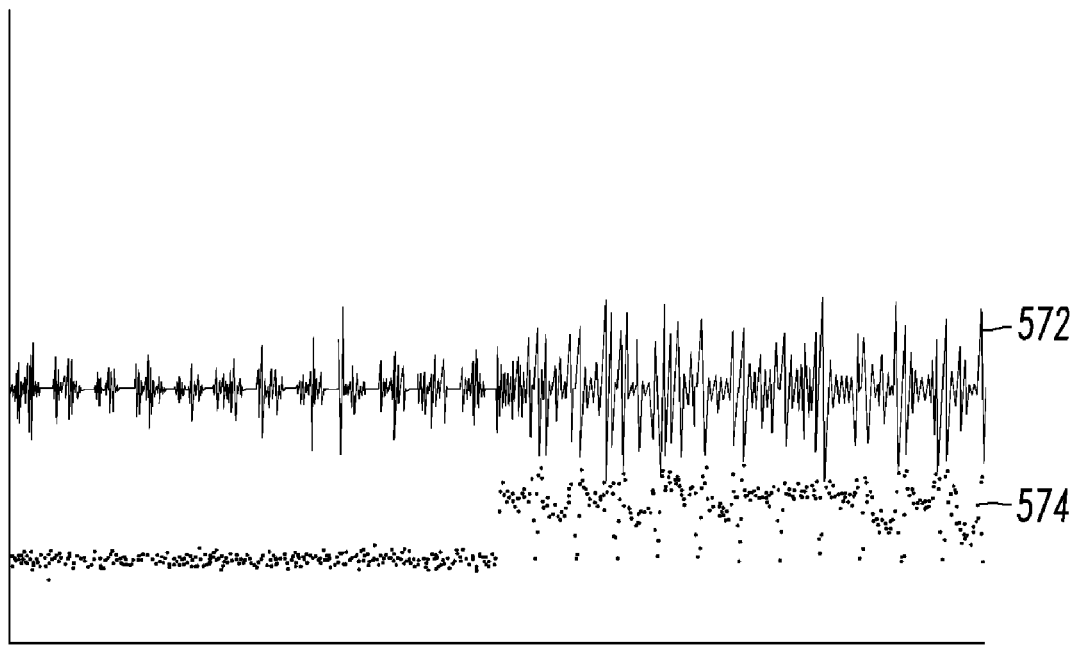
FIG. 13 is a plot of the net noise detected by the tuned current sensor, and the output of the minimum detector of FIG. 4 for an arc in series with a resistive load in parallel with a universal commutating motor.

An example of series arc detection in the presence of noise sources is discussed in connection with FIG. 13, which pertains to an arc in series with a resistor, which arc occurs in parallel with a handheld sander (not shown). This arc is similar to the operation inhibition configuration B test described in UL1699. The noise generated by universal motor commutation inside the handheld sander is composed of a series of discrete, short-lived bursts that occur many times per half-cycle. However, when an arc occurs in series with the resistor (e.g., starting at the moment when the series arc voltage becomes non-zero), the peak amplitude of the net noise signal 572 (i.e., the sum of the noise from the sander and the arc) remains approximately the same. However, the net noise signal 572 becomes continuous throughout a substantial portion of each half-cycle. Thus, the minimum detector output 574 does not respond to noise generated by the handheld sander (because this noise is composed of momentary, discrete bursts), but does respond to the net noise generated by the handheld sander and the series arc (because the series arc causes the net noise to be continuous throughout a substantial portion of each half-cycle).

EXAMPLE 20

The periodically reset analog minimum detector 66 of FIG. 4 in combination with the demodulating logarithmic amplifier 60 results in the arc fault detector 56 being highly effective at rejecting high-frequency, broadband power line noise associated with commutation arcing and power electronics switching.

The minimum detector 66 only passes continuous bursts of high-frequency, broadband power line noise which persist for more than a predetermined time interval (e.g., as defined by the reset period of the minimum detector 66), which may then be analyzed for properties that are indicative of series arcing (as described herein).

Since the processing of the routines 92,300,400 are based on the difference between broadband noise during arcing and the ambient noise, it is believed to be relatively insensitive to variations in the "noise floor" from distribution feeder to distribution feeder.

Although the example routines 92,300,400 disclosed herein employ 32 samples per half-cycle, the minimum detector output 70 tracks the minimum of the demodulating logarithmic amplifier output 65, so there is no need to sample rapidly to try to catch the "no arc conduction" portion of minimum broadband noise produced by the series arc. Thus, fewer samples per half-cycle can be used.

EXAMPLE 21

Although separable contacts 52 are disclosed, suitable solid state separable contacts may be employed. For example, the disclosed arc fault circuit interrupter 50 includes a suitable circuit interrupter mechanism, such as the separable contacts 52 that are opened and closed by the operating mechanism 54, although the disclosed concept is applicable to a wide range of circuit interruption mechanisms (e.g., without limitation, solid state or FET switches; contactor contacts) and/or solid state based control/protection devices (e.g., without limitation, drives; soft-starters).

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. An arc fault circuit interrupter comprising:
 separable contacts;
 an operating mechanism structured to open and close said separable contacts;
 an arc fault detector structured to detect an arc fault condition operatively associated with said separable contacts, said arc fault detector comprising:
  a tuned current sensor structured to sense broadband noise of a current flowing through said separable contacts, a compression circuit including an input of said sensed broadband noise from said tuned current sensor and an output, said compression circuit being structured to
  compress the dynamic range of said sensed broadband noise,
  a minimum detector including an input of the output of said compression circuit and an output of the minimum value of said input of said minimum detector, and
  processor including a number of inputs and an output, one of said number of inputs being the output of the minimum value of said minimum detector; and
 a trip mechanism cooperating with the output of said processor and said operating mechanism to trip open said separable contacts responsive to said detected arc fault condition,
 wherein said processor is structured to determine a minimum value from the output of said minimum detector for each of a plurality of line half-cycles, a maximum value from the output of said minimum detector for each of said line half-cycles, and a dynamic range value from the difference between said maximum value and said determined minimum value.

2. The arc fault circuit interrupter of claim 1 wherein said tuned current sensor is structured to output said sensed broadband noise.

3. The arc fault circuit interrupter of claim 2 wherein said tuned current sensor is a current transformer structured to resonate at about 15 MHz.

4. The arc fault circuit interrupter of claim 1 wherein said compression circuit is a demodulating logarithmic amplifier structured to rectify said sensed broadband noise and perform a logarithmic conversion of the amplitude of said rectified sensed broadband noise.

5. The arc fault circuit interrupter of claim 1 wherein said processor is structured to periodically input the output of said minimum detector.

6. The arc fault circuit interrupter of claim 1 wherein said minimum detector is structured to reject discretely spaced, high frequency pulses of said sensed broadband noise.

7. The arc fault circuit interrupter of claim 6 wherein said discretely spaced, high frequency pulses of said sensed broadband noise are generated by one of a universal motor and a power supply.

8. The arc fault circuit interrupter of claim 6 wherein said minimum detector is structured to pass high frequency pulses of said sensed broadband noise from said arc fault condition.

9. The arc fault circuit interrupter of claim 1 wherein said arc fault detector further comprises a line current sensor including an output structured to output a signal proportional to line current; and wherein one of said number of inputs of said processor is the output of said line current sensor.

10. The arc fault circuit interrupter of claim 9 wherein said arc fault detector further comprises a line voltage zero crossing detector structured to synchronize said processor with a line voltage.

11. The arc fault circuit interrupter of claim 1 wherein said processor comprises an analog-to-digital converter structured to input and convert the output of said minimum detector.

12. The arc fault circuit interrupter of claim 1 wherein the output of said minimum detector is proportional to the minimum of the logarithm of the envelope of said sensed broadband noise; wherein the output of said minimum detector is structured to increase in response to continuous broadband noise from said arc fault condition; and wherein the output of said minimum detector is structured to not increase in response to non-continuous broadband noise.

13. The arc fault circuit interrupter of claim 1 wherein said processor is structured to determine if a predetermined number of alternating current half-cycles indicates series arcing occurring within a predetermined time interval, and to responsively set the output of said processor to responsively trip open said separable contacts.

14. An arc fault circuit interrupter comprising:
separable contacts;
an operating mechanism structured to open and close said separable contacts;
an arc fault detector structured to detect an arc fault condition operatively associated with said separable contacts, said arc fault detector comprising:
    a tuned current sensor structured to sense broadband noise of a current flowing through said separable contacts,
    a compression circuit including an input of said sensed broadband noise from said tuned current sensor and an output, said compression circuit being structured to compress the dynamic range of said sensed broadband noise,
    a minimum detector including an input of the output of said compression circuit and an output of the minimum value of said input of said minimum detector, and
    a processor including a number of inputs and an output, one of said number of inputs being the output of the minimum value of said minimum detector; and
a trip mechanism cooperating with the output of said processor and said operating mechanism to trip open said separable contacts responsive to said detected arc fault condition,
wherein said processor is structured to periodically input the output of said minimum detector, and
wherein said processor is further structured to input the output of said minimum detector synchronous with an alternating current half-cycle, compare a profile of the output of said minimum detector versus phase angle of said alternating current half-cycle against a plurality of profiles operatively associated with series arcs, and determine whether each alternating current half-cycle corresponds to one of said plurality of profiles.

15. An arc fault circuit interrupter comprising:
separable contacts;
an operating mechanism structured to open and close said separable contacts;
an arc fault detector structured to detect an arc fault condition operatively associated with said separable contacts, said arc fault detector comprising:
    a tuned current sensor structured to sense broadband noise of a current flowing through said separable contacts,
    compression circuit including an input of said sensed broadband noise from said tuned current sensor and an output, said compression circuit being structured to compress the dynamic range of said sensed broadband noise,
    a minimum detector including an input of the output of said compression circuit and an output of the minimum value of said input of said minimum detector, and
    a processor including a number of inputs and an output, one of said number of inputs being the output of the minimum value of said minimum detector; and
a trip mechanism cooperating with the output of said processor and said operating mechanism to trip open said separable contacts responsive to said detected arc fault condition
wherein said arc fault detector further comprises a zero crossing detector structured to synchronize said processor with a plurality of line half-cycles; and wherein said processor comprises an analog-to-digital converter structured to input and convert the output of said minimum detector, and a routine structured to input and reset the output of said minimum detector a plurality of times for each of said line half-cycles.

16. The arc fault circuit interrupter of claim 15 wherein said processor comprises a routine structured to determine a minimum value from the output of said minimum detector for each of said line half-cycles, a maximum value from the output of said minimum detector for each of said line half-cycles, a dynamic range value from the difference between said maximum value and said minimum value, a count of a number of the outputs of said minimum detector that exceed a first predetermined value for each of said line half-cycles, and a condition defined by: (a) said dynamic range value being greater than a second predetermined value, (b) said minimum value occurs at one of either a plurality of the outputs of said minimum detector at the beginning of a corresponding one of said line half-cycles or a plurality of the outputs of said minimum detector at the end of the corresponding one of said line half-cycles, and (c) said count of the number of the outputs of said minimum detector that exceed the first predetermined value being greater than a third predetermined value.

17. The arc fault circuit interrupter of claim 16 wherein the routine of said processor is further structured to input 32 samples of the outputs of said minimum detector for each of said line half-cycles; wherein said plurality of the outputs of said minimum detector at the beginning of the corresponding one of said line half-cycles are about the first five of said 32 samples; and wherein said plurality of the outputs of said minimum detector at the end of the corresponding one of said line half-cycles are about the last five of said 32 samples.

18. The arc fault circuit interrupter of claim 16 wherein the routine of said processor is further structured to input 32 samples of the outputs of said minimum detector for each of said line half-cycles; wherein said plurality of the outputs of said minimum detector at the beginning of the corresponding one of said line half-cycles are about the first three of said 32 samples; and wherein said plurality of the outputs of said minimum detector at the end of the corresponding one of said line half-cycles are about the last two of said 32 samples.

19. The arc fault circuit interrupter of claim 15 wherein said processor comprises a routine structured to determine a minimum value from the output of said minimum detector for each of said line half-cycles, a maximum value from the output of said minimum detector for each of said line half-cycles, a dynamic range value from the difference between said maximum value and said minimum value, a count of a number of the outputs of said minimum detector that either exceed a first predetermined value for each of said line half-cycles or that are less than a second predetermined value for each of said line half-cycles, a maximum change value between adjacent pairs of the output of said minimum detector for the plurality of times for each of said line half-cycles, a position value corresponding to the maximum change value for one of said plurality of times, and a condition defined by: (a) said dynamic range value being greater than a third predetermined value, (b) said maximum change value being greater than a fourth predetermined value, (c) said position value being greater than a fifth predetermined value and being less than a sixth predetermined value, and (d) said count being greater than a seventh predetermined value.

20. An arc fault circuit interrupter comprising:
separable contacts;
an operating mechanism structured to open and close said separable contacts;
an arc fault detector structured to detect an arc fault condition operatively associated with said separable contacts, said arc fault detector comprising:
a tuned current sensor structured to sense broadband noise of a current flowing through said separable contacts,
a compression circuit including an input of said sensed broadband noise from said tuned current sensor and an output, said compression circuit being structured to compress the dynamic range of said sensed broadband noise,
a minimum detector including an input of the output of said compression circuit and an output of the minimum value of said input of said minimum detector, and
a processor including a number of inputs and an output, one of said number of inputs being the output of the minimum value of said minimum detector; and
a trip mechanism cooperating with the output of said processor and said operating mechanism to trip open said separable contacts responsive to said detected arc fault condition,
wherein said processor comprises a routine structured to determine a minimum value from the output of said minimum detector for each of said line half-cycles, a maximum value from the output of said minimum detector for each of said line half-cycles, a dynamic range value from the difference between said maximum value and said minimum value, a maximum difference between subsequent values from the output of said minimum detector for each of said line half-cycles, a count of a number of the outputs of said minimum detector that are less than a first predetermined value for each of said line half-cycles plus a number of the outputs of said minimum detector that are greater than a second predetermined value for each of said line half-cycles, and a condition defined by: (a) said dynamic range value being greater than a third predetermined value, (b) the last said count being greater than a fourth predetermined value, (c) said maximum difference being greater than a fifth predetermined value, (d) said maximum difference occurs after a first sample at the beginning of a corresponding one of said line half-cycles, and (e) said maximum difference occurs before a plurality of samples at the end of the corresponding one of said line half-cycles.

21. The arc fault circuit interrupter of claim 20 wherein the routine of said processor is further structured to input 32 samples of the outputs of said minimum detector for each of said line half-cycles; and wherein said maximum value occurs before about the $25^{th}$ one of said 32 samples at the end of the corresponding one of said line half-cycles.

22. The arc fault circuit interrupter of claim 20 wherein the routine of said processor is further structured to input and reset the output of said minimum detector a plurality of times for each of a plurality of line half-cycles, determine a maximum change value between adjacent pairs of the output of said minimum detector for said plurality of times for each of said plurality of line half-cycles, a position value corresponding to the maximum change value for one of said plurality of times, and a condition defined by: (a) said dynamic range value being greater than a sixth predetermined value, (b) said maximum change value being greater than a seventh predetermined value, (c) said position value being greater than an eighth predetermined value and being less than a ninth predetermined value, and (d) said count being greater than a tenth predetermined value.

23. A method of detecting an arc fault condition of an alternating current power circuit having a plurality of half-cycles, said method comprising:
sensing broadband noise of a current flowing in said power circuit;
compressing the dynamic range of said sensed broadband noise;
detecting a minimum of said compressed and sensed broadband noise for a plurality of samples for each of said half-cycles;
determining a minimum value from said minimum of the compressed and sensed broadband noise for said samples for each of said half-cycles;
determining a maximum value from said minimum of the compressed and sensed broadband noise for said samples for each of said half-cycles;
determining a dynamic range value from the difference between said maximum value and said minimum value;
determining a count of a number of said samples that exceed a first predetermined value for each of said line half-cycles;
determining a condition defined by: (a) said dynamic range value being greater than a second predetermined value, (b) said minimum value occurs at one of either a plurality of the samples at the beginning of a corresponding one of said line half-cycles or a plurality of the samples at the end of the corresponding one of said line half-cycles, and (c) said count of the number of the samples that exceed the first predetermined value being greater than a third predetermined value;
increasing an accumulator responsive to said condition being met or decreasing said accumulator responsive to said condition not being met; and
detecting said arc fault condition when said accumulator exceeds a fourth predetermined value.

24. A method of detecting an arc fault condition of an alternating current power circuit having a plurality of half-cycles, said method comprising:
sensing broadband noise of a current flowing in said power circuit;
compressing the dynamic range of said sensed broadband noise;

detecting a minimum of said compressed and sensed broadband noise for a plurality of samples for each of said half-cycles;

determining a minimum value from said minimum of the compressed and sensed broadband noise for said samples for each of said half-cycles;

determining a maximum value from said minimum of the compressed and sensed broadband noise for said samples for each of said half-cycles;

determining a dynamic range value from the difference between said maximum value and said minimum value;

determining a maximum difference between subsequent values from said minimum of the compressed and sensed broadband noise for each of said line half-cycles;

determining a count of a number of said minimum of the compressed and sensed broadband noise that are less than a first predetermined value for each of said line half-cycles plus a number of said minimum of the compressed and sensed broadband noise that are greater than a second predetermined value for each of said line half-cycles;

determining a condition defined by: (a) said dynamic range value being greater than a third predetermined value, (b) the last said count being greater than a fourth predetermined value, (c) said maximum difference being greater than a fifth predetermined value, (d) said maximum difference occurs after a first sample at the beginning of a corresponding one of said line half-cycles, and (e) said maximum difference occurs before a plurality of samples at the end of the corresponding one of said line half-cycles;

increasing an accumulator responsive to said condition being met or decreasing said accumulator responsive to said condition not being met; and detecting said arc fault condition when said accumulator exceeds a sixth predetermined value.

\* \* \* \* \*